(12) United States Patent
Miyajima

(10) Patent No.: US 8,548,960 B2
(45) Date of Patent: Oct. 1, 2013

(54) MUSIC PROCESSING METHOD AND APPARATUS TO USE MUSIC DATA OR METADATA OF MUSIC DATA REGARDLESS OF AN OFFSET DISCREPANCY

(75) Inventor: Yasushi Miyajima, Kanagawa (JP)

(73) Assignee: Sony Corporation, Tokyo (JP)

( * ) Notice: Subject to any disclaimer, the term of this patent is extended or adjusted under 35 U.S.C. 154(b) by 559 days.

(21) Appl. No.: 12/537,451

(22) Filed: Aug. 7, 2009

(65) Prior Publication Data

US 2010/0057734 A1    Mar. 4, 2010

(30) Foreign Application Priority Data

Sep. 3, 2008  (JP) ................................ P2008-226344

(51) Int. Cl.
*G06F 17/30*  (2006.01)

(52) U.S. Cl.
USPC ............................ 707/688; 707/690; 707/694

(58) Field of Classification Search
USPC .......................................... 707/688, 690, 694
See application file for complete search history.

(56) References Cited

U.S. PATENT DOCUMENTS

| | | | |
|---|---|---|---|
| 6,167,372 A | | 12/2000 | Maeda |
| 2002/0165718 A1 | | 11/2002 | Graumann |
| 2003/0221544 A1 | | 12/2003 | Weissflog |
| 2004/0064209 A1 | | 4/2004 | Zhang |
| 2004/0172240 A1 | * | 9/2004 | Crockett et al. .............. 704/205 |
| 2004/0194612 A1 | * | 10/2004 | Parees ............................ 84/609 |
| 2005/0154973 A1 | | 7/2005 | Otsuka |
| 2005/0239446 A1 | * | 10/2005 | Tagawa et al. ............. 455/414.1 |
| 2005/0273328 A1 | | 12/2005 | Padhi |
| 2006/0254411 A1 | * | 11/2006 | Alcalde et al. .................. 84/608 |
| 2007/0022867 A1 | | 2/2007 | Yamashita |
| 2007/0088539 A1 | * | 4/2007 | Hirota et al. .................. 704/211 |
| 2007/0255739 A1 | | 11/2007 | Miyajima et al. |
| 2008/0130908 A1 | * | 6/2008 | Cohen et al. ................. 381/71.1 |
| 2008/0236370 A1 | * | 10/2008 | Sasaki et al. .................... 84/612 |
| 2009/0019995 A1 | | 1/2009 | Miyajima |

FOREIGN PATENT DOCUMENTS

| | | |
|---|---|---|
| JP | 2002-278547 | 9/2002 |
| JP | 2007-166090 | 6/2007 |
| JP | 2007-248895 | 9/2007 |
| JP | 2007-292827 | 11/2007 |
| JP | 2008-164932 | 7/2008 |

OTHER PUBLICATIONS

Notification of Reasons for Refusal with English language translation issued by Japanese Patent Office on Sep. 7, 2010 in corresponding Japanese application No. 2008-226344.

(Continued)

*Primary Examiner* — Son T Hoang
(74) *Attorney, Agent, or Firm* — Finnegan Henderson Farabow Garrett & Dunner LLP

(57) ABSTRACT

A method to use music data or metadata of music data regardless of an offset discrepancy including steps of: determining code values according to a volume transition in every certain period starting from a coding start position on a time axis in music data; and generating a characteristic pattern indicating a characteristic of a volume transition of the music data using a series of the code values determined over plural periods. The code value can be configured to indicate whether an average volume in a certain period is increased or decreased from an average volume in a previous period, for example.

6 Claims, 22 Drawing Sheets

(56) References Cited

OTHER PUBLICATIONS

Darko Kirovski and Hagai Attias, "Beat-ID: Identifying Music via Beat Analysis". IEEE 2002 Workshop on Multimedia Processing, pp. 190-193 (2002).

Partial European Search Report issued by the European Patent Office on Nov. 5, 2010, in corresponding European application No. EP 09251941.

* cited by examiner

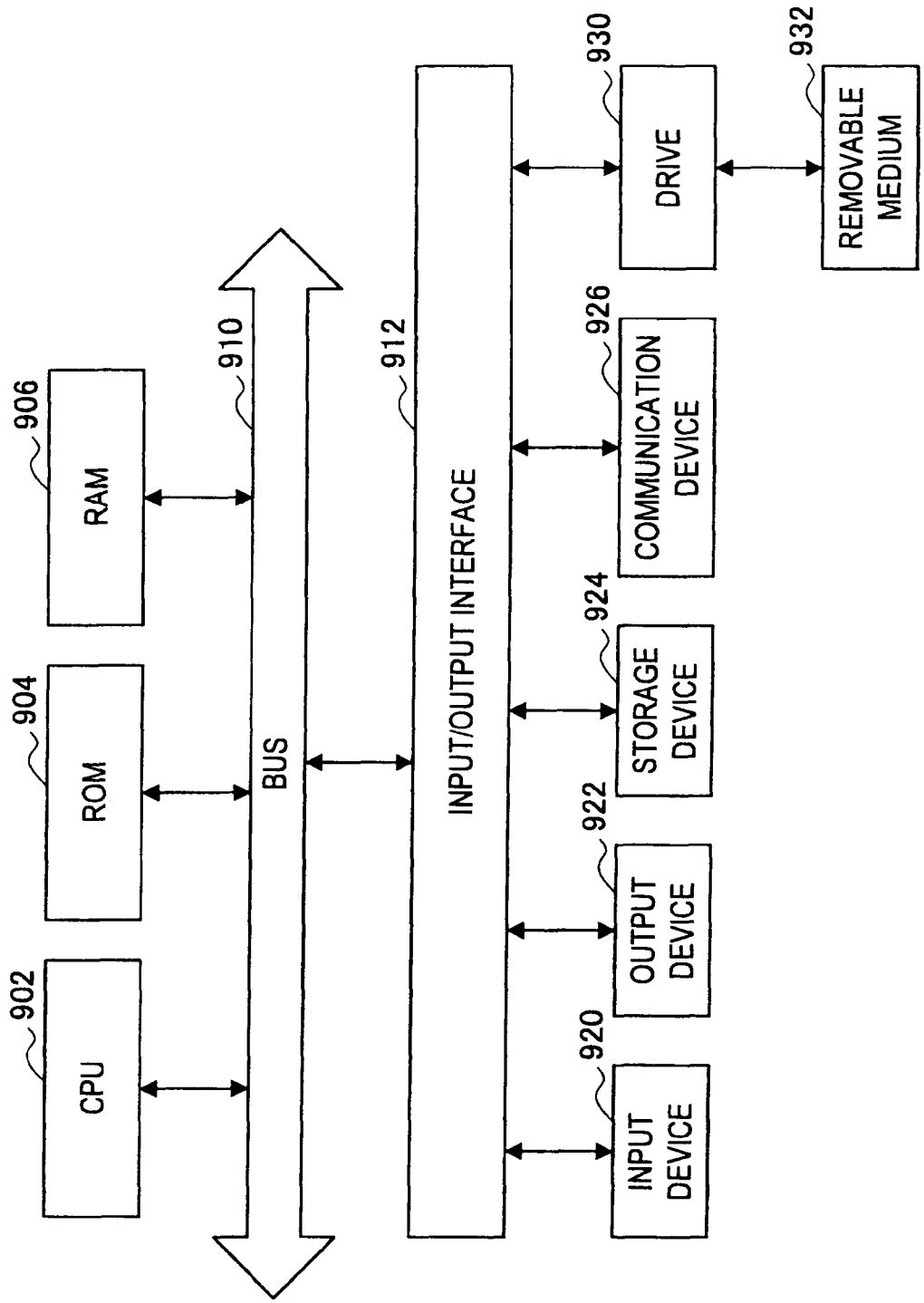

MUSIC PROCESSING METHOD AND APPARATUS TO USE MUSIC DATA OR METADATA OF MUSIC DATA REGARDLESS OF AN OFFSET DISCREPANCY

BACKGROUND OF THE INVENTION

1. Field of the Invention

The present invention relates to a music processing method, a music processing apparatus and a program.

2. Description of the Related Art

In recent years, because of the improved performance of information processing apparatuses, digitized music data has been used in new ways. One of the new ways of the usage is remixing. In general, remixing refers to a method for combining an entire or a part of plural pieces of music to compose a new entire music. Although remixing itself has been performed in the past, it becomes easier for users who do not have any dedicated devices to remix music data using a PC (Personal Computer) so that more users remix data and more remixed data are exchanged among the users. Further, a slide show, in which music is played in association with scenes of displayed pictures or slides, is one of the new usages of music data. Such slide shows have been widely used in presentations at events and product promotions.

When music data is used in remixing or slide shows, using metadata attached to the music data is effective. Metadata includes not only static data such as a title and an artist name but also data obtained by a time-series analysis of the music data, such as rhythms, beat positions, length or position of bars, chord progressions, and melody types. When such time-series metadata is used, it becomes easier to extract a specific bar from the music data or adjust rhythms and beat positions.

Further, other users who simply enjoy playing music can take advantages of usage of metadata. For example, it is effective to use characteristics of music indicated by metadata to quickly search desired music data among huge amount of pieces of music data stored in a mass memory medium such as a hard disk or a flash memory.

In this point of view, technology for generating metadata related to music data or supporting usage of metadata has been developed. For example, Japanese Patent Application Laid-Open No. 2007-248895 discloses a metadata creation apparatus capable of automatically extracting beat positions or a head position of a bar in music data and providing the data to users so that the users can correct the data easily. Japanese Patent Application Laid-Open No. 2008-164932 discloses a music editing apparatus capable of appropriately adjusting a timing to play music data by using metadata such as beat positions applied to the music.

SUMMARY OF THE INVENTION

However, music data recoded in media in different environments may cause a discrepancy of offsets from a data start point to a performance start point, even when the original music is the same, because of differences in data reading apparatuses or differences in encoding parameters. For example, when time-series metadata is supplied separately from the music data, the offset discrepancy may cause that the metadata does not match to the music data. When the metadata does not match to the music data, remixing, slide show, or music data search using metadata may not provide a result expected by users.

The present invention has been made in view of the above issue and it is desirable to provide a new or improved music processing method, a music processing apparatus and a program to use music data or metadata of music data regardless of an offset discrepancy.

According to an embodiment of the present invention, there is provided a music processing method including the steps of: determining code values according to a volume transition in every certain period starting from a coding start position on a time axis in music data; and generating a characteristic pattern indicating a characteristic of a volume transition of the music data using a series of the code values determined over plural periods.

The code value may indicate whether an average volume in a certain period is increased or decreased from an average volume of a previous period.

The music processing method may further include the step of determining the coding start position by acquiring a window position where an average volume in a window width on the time axis in the music data excesses an average volume of an entire or a part of the music data for the first time.

The music processing method may further include the step of calculating a degree of similarity of characteristic patterns of the music data by comparing the characteristic pattern generated for the music data and a characteristic pattern of arbitrary music data.

The degree of similarity may be calculated as a ratio of a number of bits of matched code values between two characteristic patterns to a number of total bits.

The degree of similarity may be calculated based on an occurrence probability in a binomial distribution for bits indicating that code values are matched and bits indicating that code values are unmatched between two characteristic patterns.

The degree of similarity may be calculated based on a maximum length of sequentially matched part of the code values of two characteristic patterns.

The music processing method may further include the step of correcting an offset of music data or metadata related to the music data based on the coding start positions corresponding to characteristic patterns of two pieces of music data having a high degree of similarity.

In the step of determining the coding start position, a plurality of the coding start positions may be determined using different window widths, and in the step of generating the characteristic pattern, a plurality of characteristic patterns for one piece of music data may be generated based on the plurality of the coding start positions.

The music processing method may further include the steps of: calculating a degree of similarity for the respective characteristic patterns by comparing the respective characteristic patterns generated for the music data with characteristic patterns of arbitrary music data; and correcting an offset of the music data or metadata related to the music data based on the coding start position corresponding to the characteristic pattern having the highest calculated degree of similarity among the plurality of characteristic patterns.

According to another embodiment of the present invention, there is provided a music processing method including the steps of: acquiring a window position where an average volume in a window width on a time axis in music data excesses an average volume of an entire or a part of the music data for the first time; and correcting an offset of the music data or metadata related to the music data based on the window position of the music data.

According to another embodiment of the present invention, there is provided a music processing apparatus including: a code value determination unit that determines code values according to a volume transition in every certain period starting from a coding start position on a time axis in music data; and a characteristic pattern generation unit that generates a characteristic pattern indicating a characteristic of a volume transition in the music data using a series of the code values over plural periods determined by the code value determination unit.

According to another embodiment of the present invention, there is provided a program causing a computer which controls an information processing apparatus to function as: a code value determination unit that determines code values according to a volume transition in every certain period starting from a coding start position on a time axis in music data; and a characteristic pattern generation unit that generates a characteristic pattern indicating a characteristic of a volume transition in the music data using a series of the code values over plural periods determined by the code value determination unit.

According to the music processing method described above, music processing apparatus and program of the present invention, music data or metadata of music data can be used regardless of an offset discrepancy.

BRIEF DESCRIPTION OF THE DRAWINGS

FIG. 22 is a block diagram showing a configuration example of a general-purpose computer.

DETAILED DESCRIPTION OF THE PREFERRED EMBODIMENTS

Figure 1:
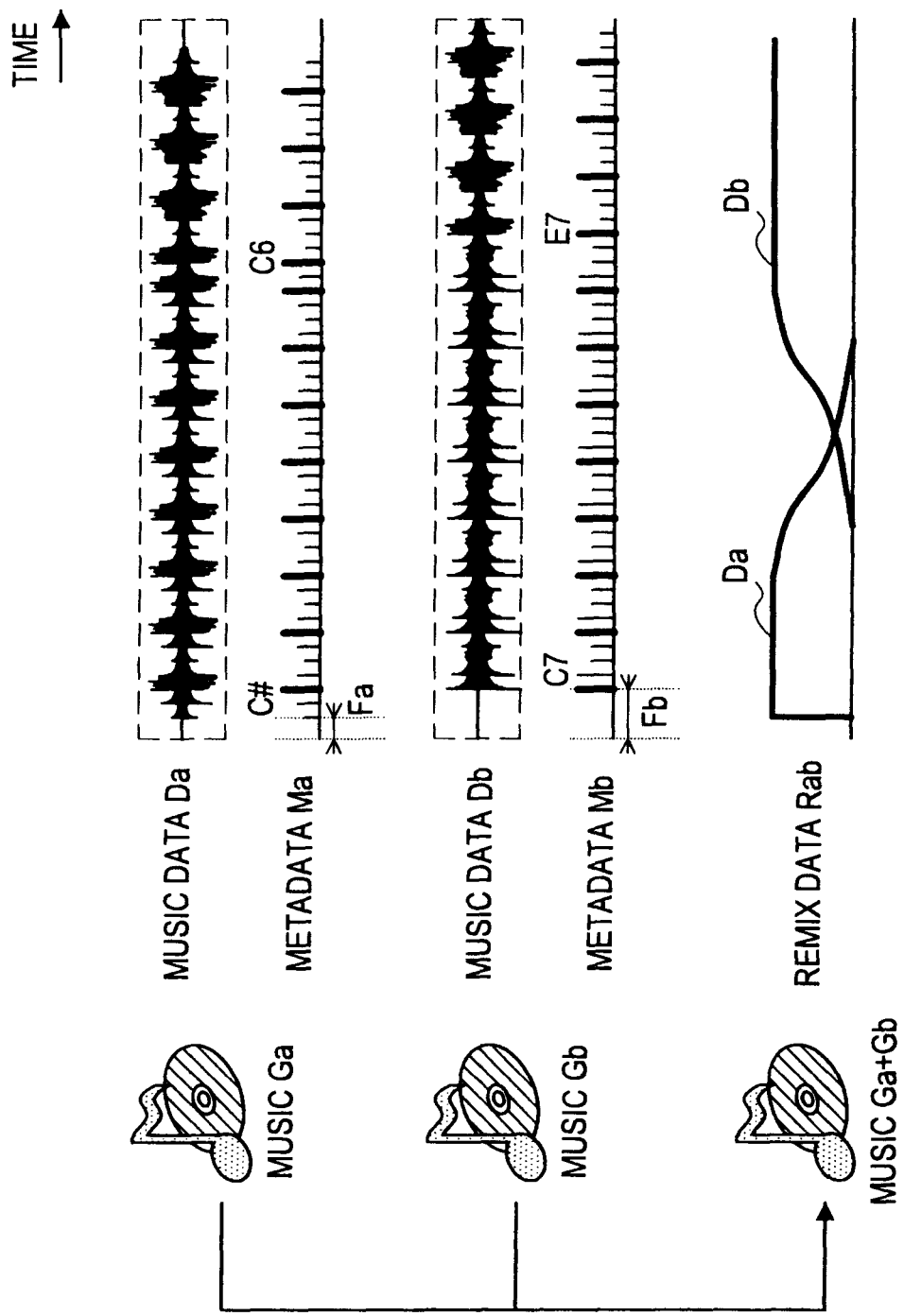
FIG. 1 is an explanatory diagram showing a relationship among music data, metadata and remix data.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The present invention will be described in the following order.

1. Issues of time-series metadata
2. First embodiment
3. Second embodiment

<1. Issues of Time-series Metadata>

Time-series metadata applied to music data will be described with reference to FIG. 1. FIG. 1 is an explanatory diagram for explaining a relationship among music data, metadata and remix data.

In FIG. 1, music data Da of music Ga and music data Db of music Gb are shown in form of waveforms of audio signals along respective time axes. The music data Da and Db may be audio data in any format such as WAVE or MP3 (MPEG Audio Layer-3).

Metadata Ma is attached to the music data Da and metadata Mb is attached to the music data Db. In the example shown in FIG. 1, the respective metadata Ma and Mb include chord progression data such as "C#," "C6," "C7" and "E7," beat position data indicated by the lines perpendicular to the time axes, and offset data indicated by offsets Fa and Fb. It is noted that, in this specification, an offset represents a time difference between the start point of music data and the start point of a music performance (that is the first time point of detecting a sound during a reproduction).

FIG. 1 also shows remix data Rab. Remix data represents data related to a "recipe" (composition) for composing new music as a whole by combining an entire or a part of plural pieces of music data. In FIG. 1, as an example of a content of remix data Rab, a composition of fading the music data Da out during a reproduction of the music data Da and fading music data Db in during the fade-out of the music data Da is shown. Here, the remix data should not limited to the example shown in FIG. 1 and may be any data related to audio signal editing such as play time specification, sound volume specification, modulation, repetition and the like.

Here, in order to accurately reproduce the music data Ga and Gb based on the remix data Rab, it is desirable that the offsets Fa and Fb accurately indicate the offsets of the music data Da and Db respectively. On the other hand, for example, when the offset Fb included in the metadata Mb is different from the offset of the music data Db, the music data Db may not be correctly faded in when the music data Db is made to fade in according to the remix data Rab.

Figure 2:
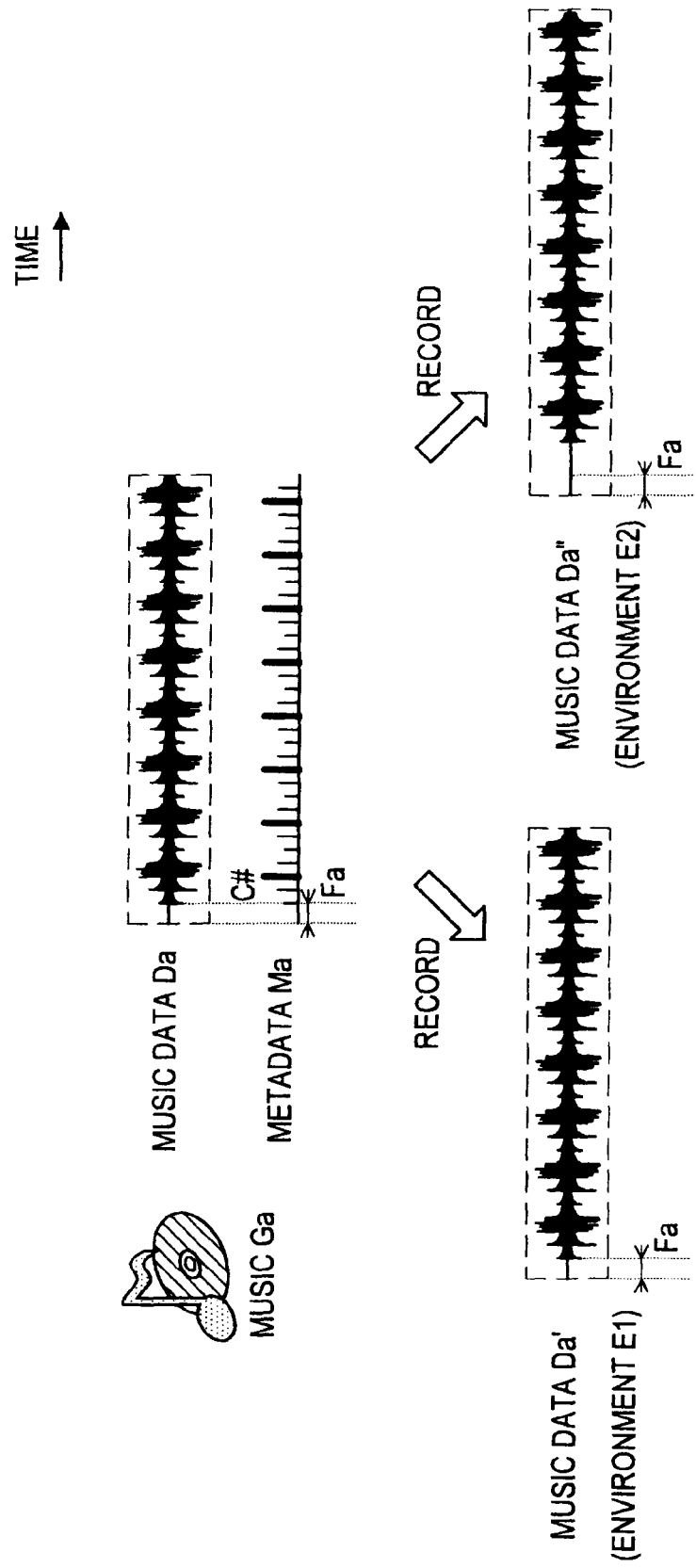
FIG. 2 is an explanatory diagram for explaining situation where music is recorded in different environments.

FIG. 2 shows a case where the music Ga is recorded in different environments E1 and E2. As shown in FIG. 2, there is a difference between an offset of music data Da' of the music Ga recorded in the environment E1 and an offset of music data Da'' of the music Ga recorded in the environment E2 due to differences in data reading devices or differences in encoding parameters, for example. As a result, the offset Fa of the metadata Ma generated in advance based on the music data Da matches to the offset of the music data Da' but does not match to the offset of the music data Da''. In other words, the metadata Ma, which is separately obtained, is no longer applicable to the music data Da'' recorded in the environment E2.

The discrepancy of offsets caused by a difference in such recording environments and the like is an unavoidable issue in current situation where music data usage has become diversified and metadata is highly likely to be distributed by itself. In this point of view, it is desired to realize a device capable of using music data or metadata of music data regardless of affects of such an offset discrepancy, which is described in this specification.

<2. First Embodiment>

Figure 3:
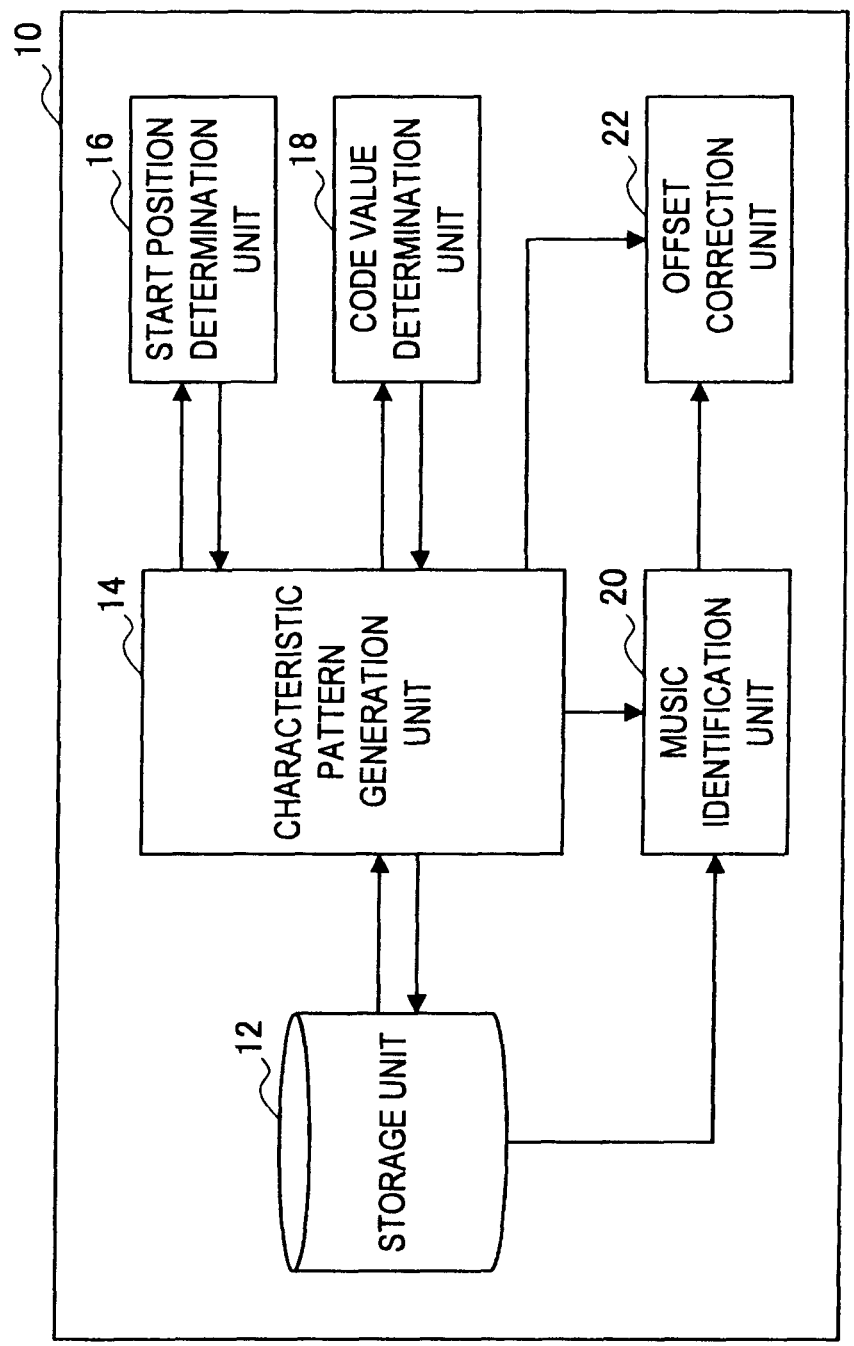
FIG. 3 is a block diagram showing a logical configuration of a music processing apparatus according to a first embodiment.

FIG. 3 is a block diagram for explaining a logical configuration of a music processing apparatus 10 according to a first embodiment of the present invention. In FIG. 3, the music processing apparatus 10 includes a storage unit 12, a characteristic pattern generation unit 14, a start position determination unit 16, a code value determination unit 18, a music identification unit 20 and an offset correction unit 22.

[Storage Unit]

The storage unit 12 is configured to have a storage device such as a hard disk and a flash memory and store music data to be processed in the music processing apparatus 10, characteristic patterns generated in a later described process, and the like.

[Characteristic Pattern Generation Unit]

The characteristic pattern generation unit 14 acquires music data from the storage unit 12 and generates a characteristic pattern, which indicates volume transition characteristics of the acquired music data. In the present embodiment, the characteristic pattern is given as an array of code values in which relative volume transition or volume change in every certain period with respect to the previous period on a time axis in music data are coded. When a characteristic pattern is generated, the characteristic pattern generation unit 14 invokes the start position determination unit 16 and let the start position determination unit 16 determine a position on the time axis where to start cording, that is, a coding start position.

[Start Position Determination Unit]

The start position determination unit 16 receives music data from the characteristic pattern generation unit 14 and determines a coding start position on the time axis to start cording characteristics of volume transitions of the music data. For example, the coding start position may be determined based on a first window position having volume greater than an average volume of the entire or a part of the music data among window widths on the time axis. Hereinafter, an example of a determining process of a coding start position by the start position determination unit 16 will be described with reference to FIGS. 4 and 5.

Figure 4:
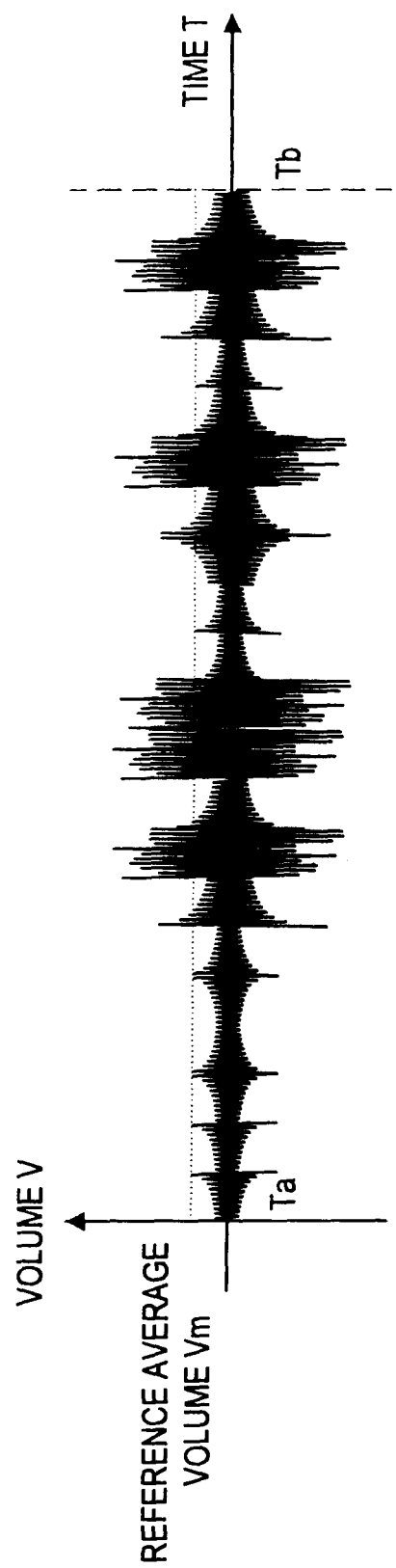
FIG. 4 is an explanatory diagram for explaining a reference average volume calculation process according to the first embodiment.

As shown in FIG. 4, the start position determination unit 16 calculates a reference average volume Vm of a predetermined range of the music data, which is used as a reference to determine a coding start position. The predetermined range used for calculating the reference average volume Vm is shown as a range from Ta to Tb in FIG. 4. The range from Ta to Tb may include the entire music data or only a part of the music data. A quantized volume of music data might be represented with positive or negative codes; however the reference average volume Vm may be an average value among absolute values of the volume or an average value among square values of the volume.

Figure 5:
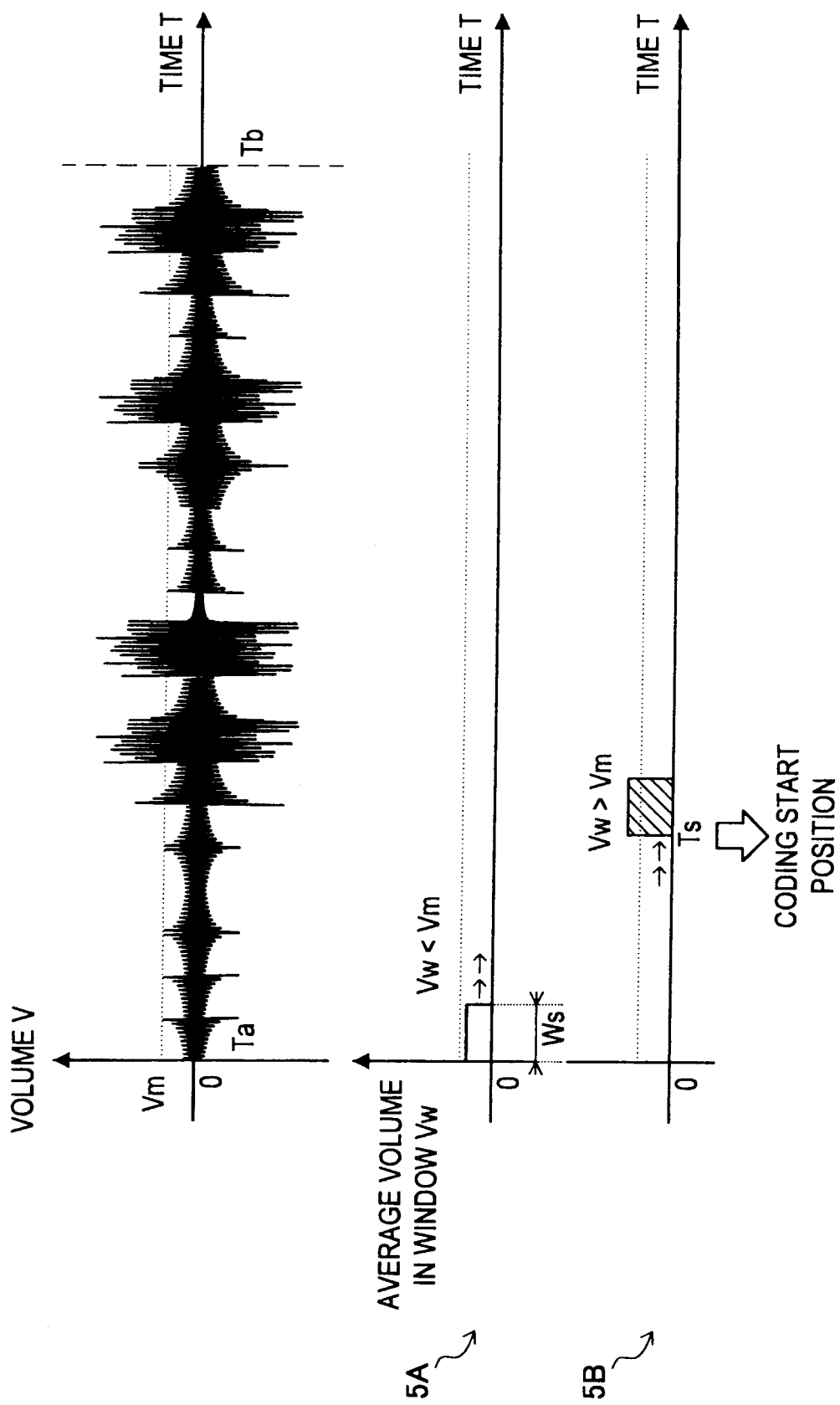
FIG. 5 is an explanatory diagram for explaining a coding start position determination process according to the first embodiment.

As shown in FIG. 5, the start position determination unit 16 searches, from the head position Ta of the range used to determine the reference average volume Vm and along the time axis, a first position where an average volume Vw of a window having window widths Ws on the time axis excesses the reference average volume Vm.

For example, at the window position shown in FIG. 5-5A, the average volume Vw of the window width Ws is less than the reference average volume Vm. The start position determination unit 16 thus shifts the next window position on the time axis in a positive direction and compares the average volume Vw of the next window width Ws with the reference average volume Vm again. It is desired to shifting the window position by smaller unit in order to improve the repeatability of the determination of the coding start position. For example, the window position may be shifted corresponding to each sample of sampling of the music data.

After the above process, it is assumed, for example, that the window position is shifted along the time axis in the positive direction and the average volume Vw of the window width Ws becomes greater than the reference average volume Vm for the first time when the start point of the window reaches to the position Ts shown in FIG. 5-5B. The start position determination unit 16 detects the position Ts and outputs the position Ts to the characteristic pattern generation unit 14 as a coding start position.

When the coding start position Ts is determined, the characteristic pattern generation unit 14 invokes the code value determination unit 18 to let the code value determination unit 18 determine code values to generate characteristic patterns for the respective certain periods from the coding start position Ts. In the present embodiment, the code value for generating characteristic pattern is assumed as a value corresponding to transitions in volume in every certain period with respect to the previous period.

[Code Value Determination Unit]

Figure 6:
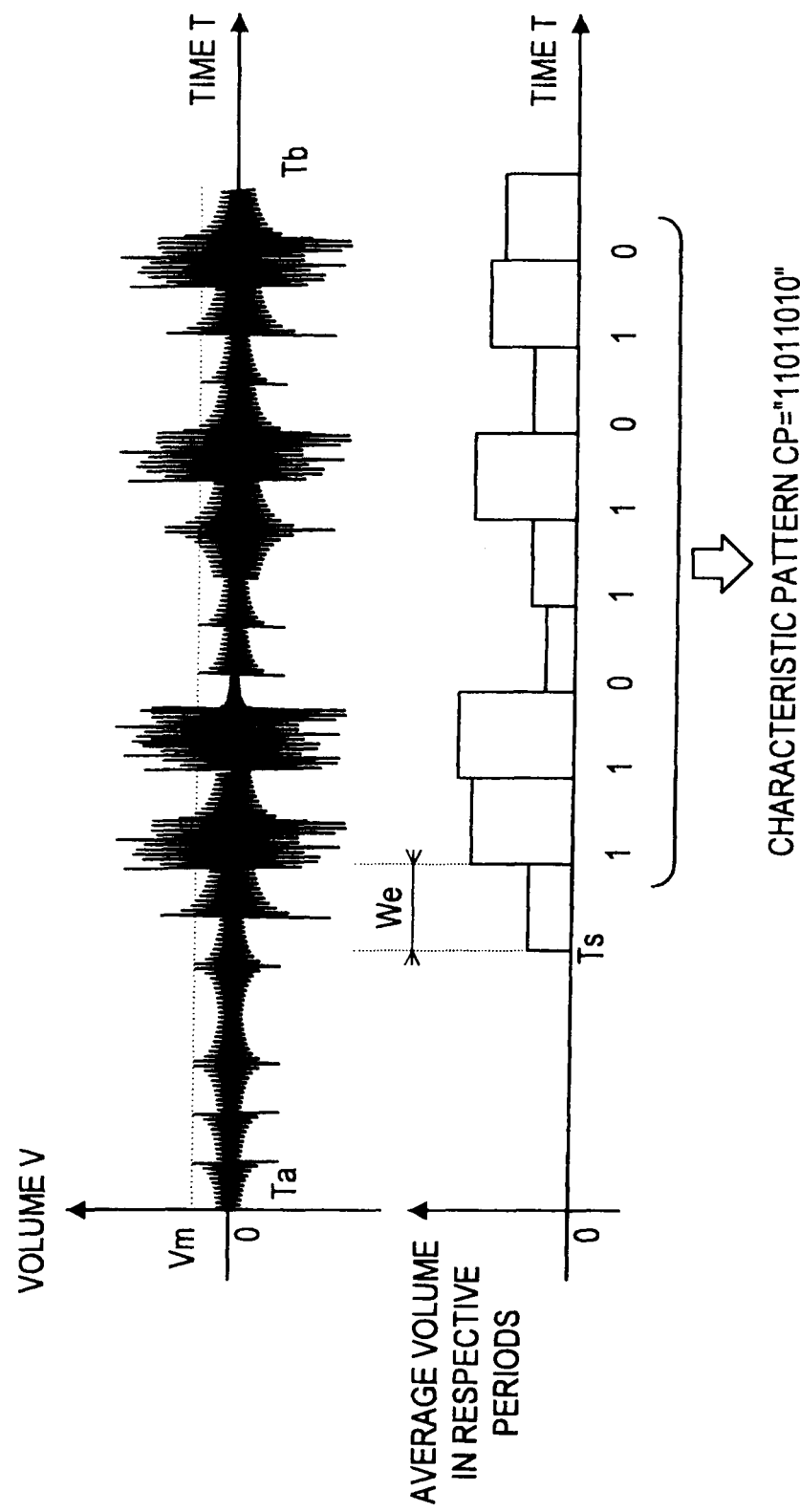
FIG. 6 is an explanatory diagram for explaining a code value determination process according to the first embodiment.

FIG. 6 is an explanatory diagram for explaining an example of a code value determination process by the code value determination unit 18. FIG. 6 shows nine coding periods having a period width Wc beginning from the coding start position Ts. Further, the average volumes of the respective periods, which are calculated in each coding period, are shown in form of heights of rectangular shapes representing the respective coding periods. In the present embodiment, the code value determination unit 18 sequentially calculates average volumes of the respective periods shown in FIG. 6 and determines code values based on whether the calculated average volumes of the respective periods are greater or less than the average volumes of the respective next previous periods.

In the example shown in FIG. 6, the code value is determined as "1" when the average volume in a subject period is greater than the average volume of the previous period and "0" when the average volume in the subject period is equal to or less than the average volume of the previous period. For example, since the average volume of the second period is greater than the average volume of the first period starting at the coding start position Ts, the first code value (the leftmost code value) is "1." Similarly, since the average volume of the third period is greater than the average volume of the second period, the second code value is also "1." On the other hand, since the average volume of the fourth period is less than the average volume of the third period, the third code value is "0."

The characteristic pattern generation unit 14 combines the code values of the respective periods, which are determined by the code value determination unit 18, and generates a characteristic pattern as a series of code values. In the example of FIG. 6, based on the determined code values of the respective coding periods, a characteristic pattern CP of "11011010" is generated. In this example, for the sake of convenience in description, the nine coding periods are shown; however the number of the coding periods (that is, the number of bits in a characteristic pattern) is preferably set to a number that is sufficient enough to identify music data among each other using the characteristic patterns.

For the generation of a characteristic pattern, not only binary values but also multiple values may be used as long as the code value represents relative volume transitions along the time axis. Further, the code value may be any value corresponding to characteristics of volume transitions such as a volume comparison between an average volume of a subject period and the reference average volume for example, as a substitute for a value corresponding to volume transitions between the subject period and the next previous period as shown in FIG. 6.

Figure 7:
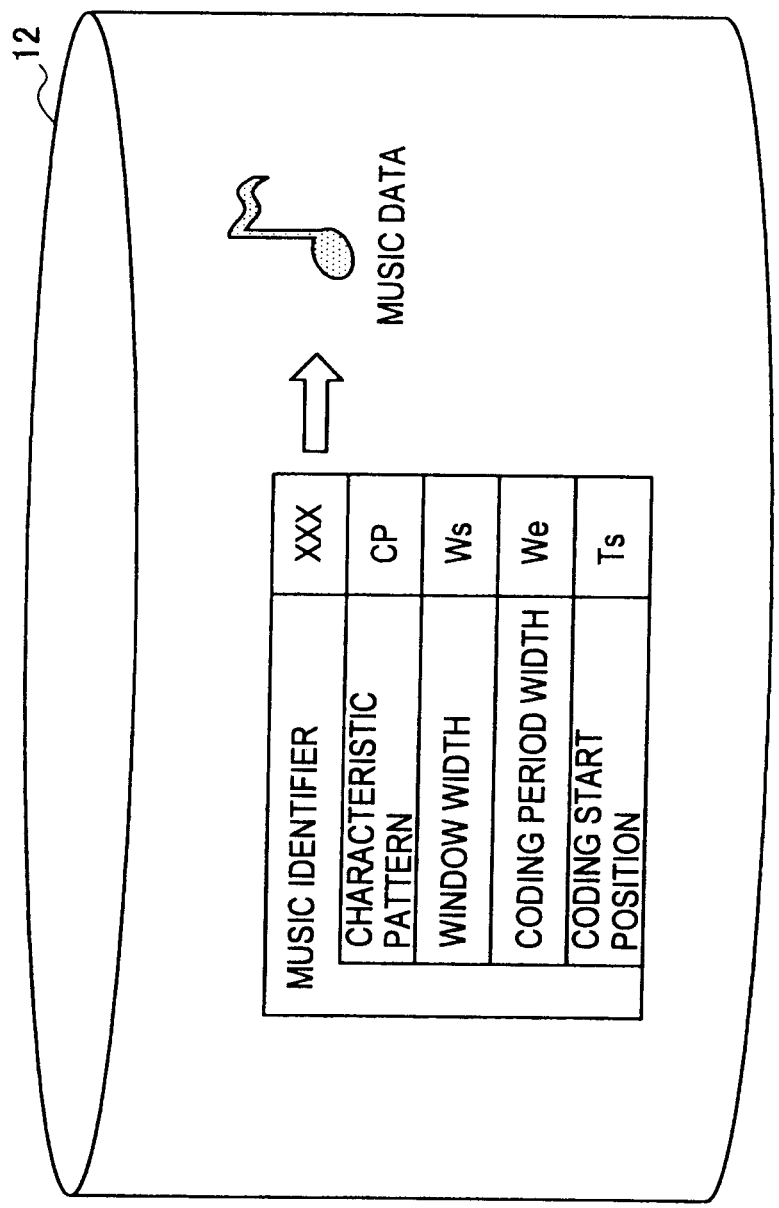
FIG. 7 is an explanatory diagram for explaining data set output from a characteristic pattern generation unit according to the first embodiment.

The characteristic pattern CP generated in the above process and the window width Ws and coding period width We used for generating the characteristic pattern CP will be used to identify music data as described below. Further, the coding start position Ts is used to correct offsets. As shown in FIG. 7, the characteristic pattern generation unit 14 handles the characteristic pattern CP, the window width Ws, the coding period width We and the coding start position Ts as a data set and stores the data set to the storage unit 12 after associating the data set with the music data using a music identifier for identifying music data, for example.

[Explanation of Process Flow: Generation of Characteristic Pattern]

Figure 8:
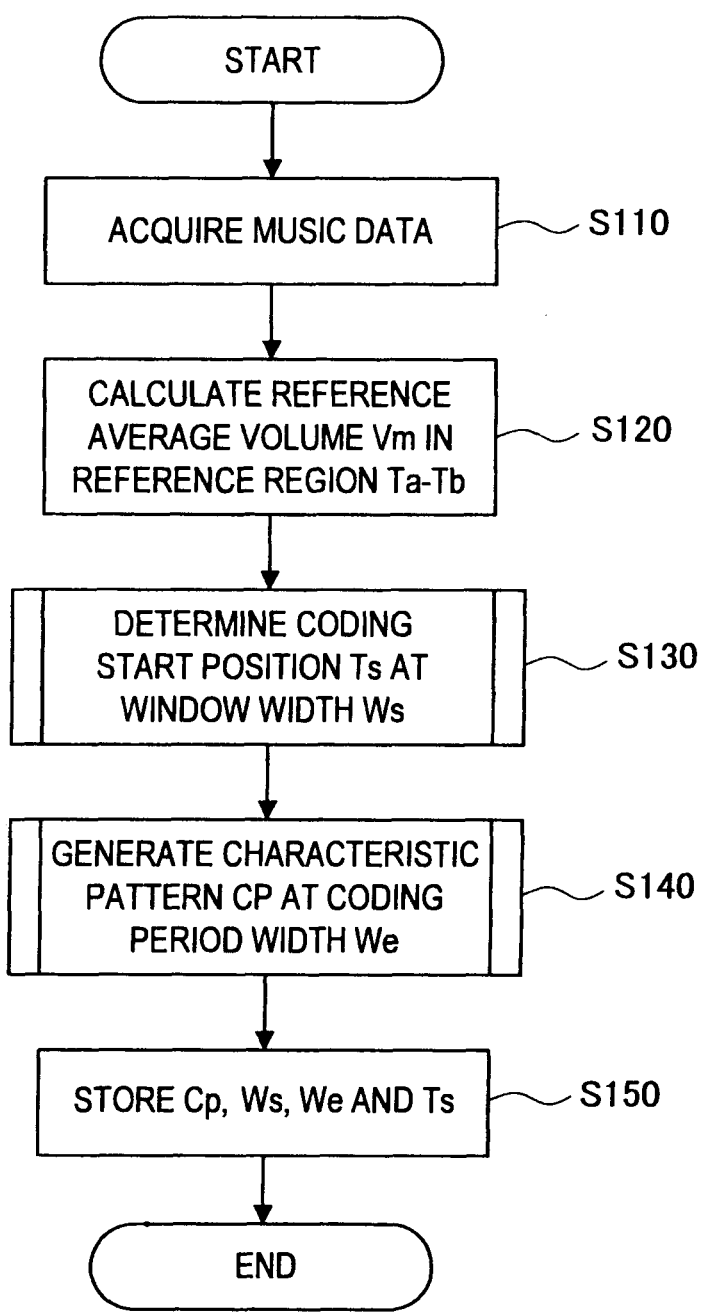
FIG. 8 is a flowchart showing an example of a characteristic pattern generation process according to the first embodiment.
Figure 9:
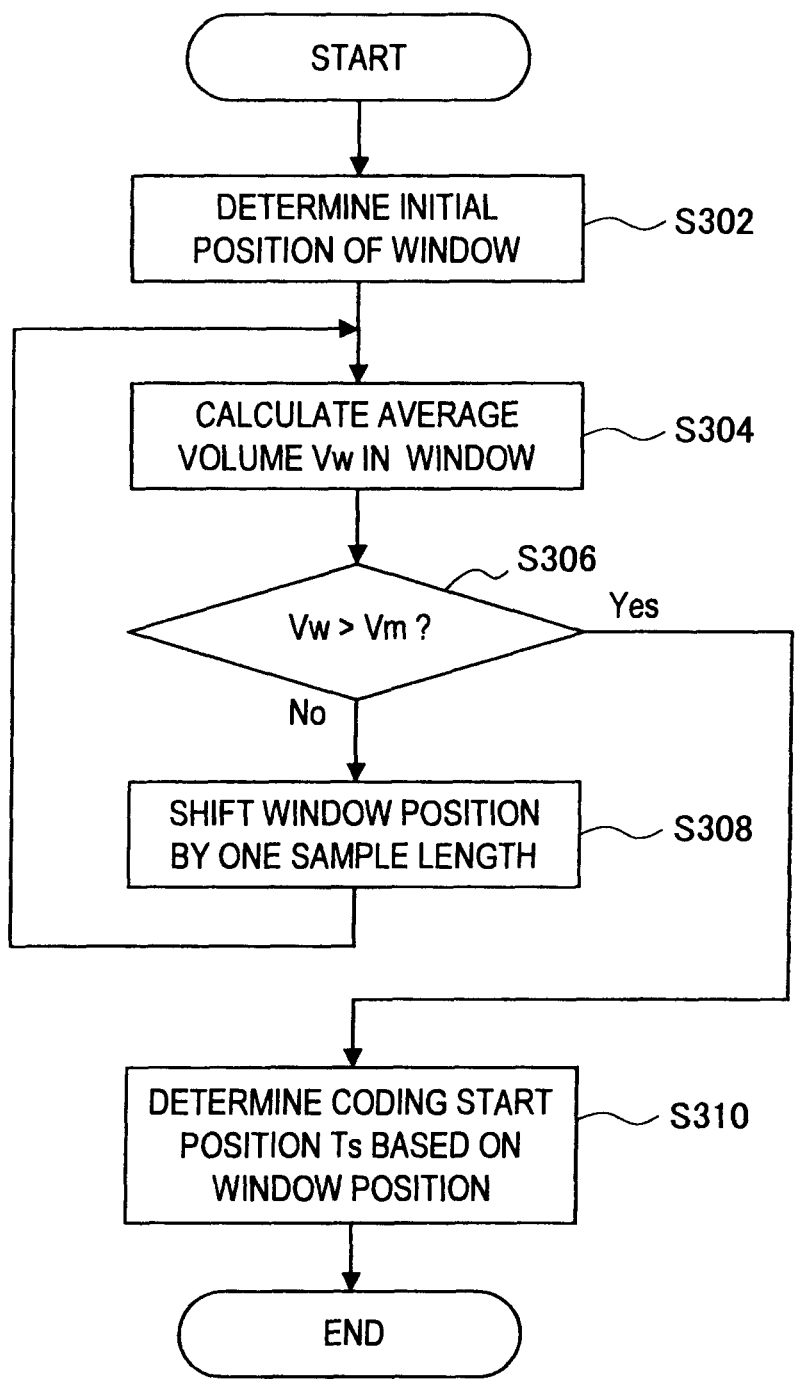
FIG. 9 is a flowchart showing an example of a coding start position determination process according to the first embodiment.
Figure 10:
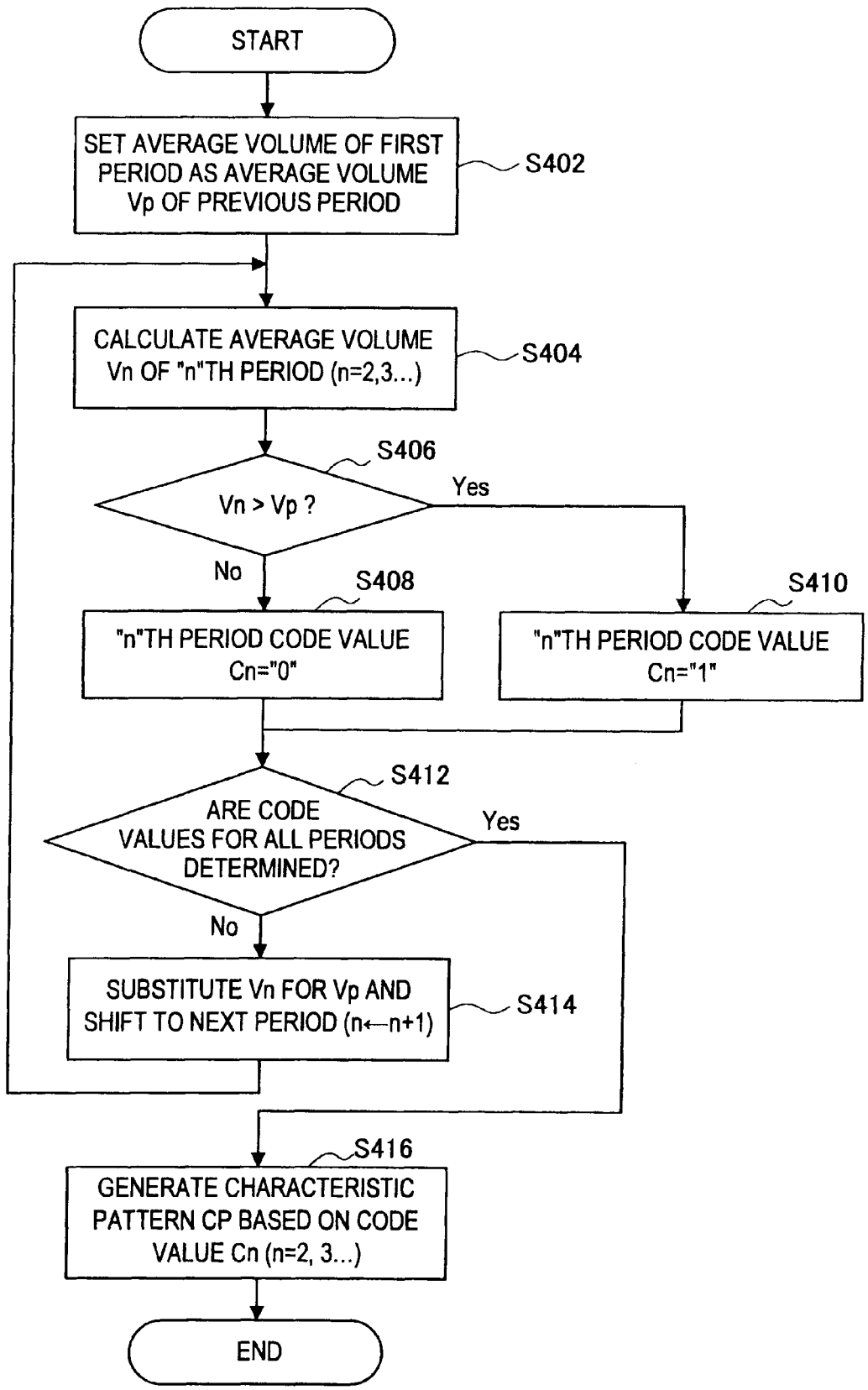
FIG. 10 is a flowchart showing an example of a code value determination process according to the first embodiment.

FIGS. 8 to 10 are flowcharts for explaining a flow of generating a characteristic pattern by the music processing apparatus 10 according to the present embodiment.

As shown in FIG. 8, the characteristic pattern generation unit 14 firstly acquires music data from the storage unit 12 (S110). The characteristic pattern generation unit 14 invokes the start position determination unit 16 and the start position determination unit 16 calculates a reference average volume Vm in the reference region Ta to Tb (S120). Then, the start position determination unit 16 determines a coding start position Ts based on the reference average volume Vm and window width Ws (S130).

FIG. 9 shows a detailed flow of determining the coding start position of step S130 in FIG. 8.

As shown in FIG. 9, an initial position of a window is firstly determined based on the start point Ta of the reference region (S302). The average volume Vw of the window at the window position is calculated (S304). Then, the calculated average volume Vw of the window and the reference average volume Vm are compared (S306). Here, for example, when the average volume Vw of the window is equal to or less than the reference average volume Vm, the window position is shifted to a next sample, for example, and the process returns to S304 (S308). On the other hand, the average volume Vw of the window is greater than the reference average volume Vm in step S306, the coding start position Ts is determined based on the window position at the timing (S310).

Referring back to FIG. 8, the flow of generating a characteristic pattern will continue. When a coding start position Ts is determined, the characteristic pattern generation unit 14 generates a characteristic pattern CP based on the coding start position Ts and the coding period width We (S140).

FIG. 10 shows a detailed flow of generating a characteristic pattern of step S140 in FIG. 8.

As shown in FIG. 10, firstly, an average volume of the first period is set as an initial value of the average volume Vp of a previous period (S402). Next, an average volume Vn of "n"th period is calculated (S404). In a first calculation, "n" is "2." Then, the calculated average volume Vn of the "n"th period is compared with the average volume Vp of the previous period (S406). Here, for example, when the average volume Vp of the previous period is equal to or greater than the average volume Vn of the "n"th period, the code value Cn of the "n"th period is determined as "0" (S408). When the average volume Vn of the "n"th period is greater, the code value Cn of the "n"th period is determined as "1" (S410). After that, it is determined whether the determination of code values for all periods is completed (S412). When the determination of code values for all periods is not finished, the average volume of the "n"th period is assigned as the average volume Vp of the previous period, "n+1" is substitute for "n", and the process returns to S404 (S414). On the other hand, when the determination of code values for all periods is completed in step S412, a characteristic pattern CP is generated based on the code values Cn (n=2, 3 . . . ) of the respective periods (S416).

With reference to FIG. 8 again, when a characteristic pattern CP is generated, the characteristic pattern generation unit 14 stores the characteristic pattern CP, the window width Ws, the coding period width We and the coding start position Ts to the storage unit 12 as one data set (S150).

With reference to FIGS. 4 to 10, the characteristic pattern generating process according to the present embodiment has been mainly described. The characteristic pattern generated in the present embodiment is a code value array of coded relative volume transitions on a time axis of music data, as described above. The volume of music data may vary due to environmental differences such as differences in data reading devices or differences in encoding parameters. However, those environmental differences evenly affect the entire music data in general. Thus, when code values are determined based on relative volume transitions on the time axis, affects of those environmental differences are canceled. In this point of view, it is appreciated that the characteristic pattern generated in the present embodiment is suitable to identify pieces of the same music recorded in different environments regardless of affects of environmental differences.

Further, in the present embodiment, the coding start position used for generating a characteristic pattern is also determined based on relative volume transitions along the time axis. In other words, in a case of using same music data, a difference of the coding start positions is caused only by performance position on the time axis of the music data, that is, an offset, in actual. With this configuration, it is appreciated that a coding start position determined in the present embodiment can be used for correcting an offset discrepancy when same music data or metadata of the music data is used.

[Music Identification Unit]

Next, referring back to FIG. 3, the music identification unit 20 configured to identify music based on the above described characteristic pattern will be described.

The music identification unit 20 compares a characteristic pattern generated for certain music data with a characteristic pattern of arbitrary music data to calculate a degree of similarity of the characteristic patterns of those pieces of music data. The characteristic pattern to be compared by the music identification unit 20 may be a characteristic pattern generated by the same music processing apparatus 10 or a characteristic pattern generated by a different device. However, it is assumed that the same window width Ws and coding period width We are used for generating the characteristic pattern.

For example, it is assumed that the characteristic pattern CP of the music data D and the window width Ws and coding period width We used to generate the characteristic pattern CP are already known. In this case, in order to determine identity of another music data Da with the music data D, the characteristic pattern CPa of the music data Da is generated based on the window width Ws and coding period width We and the generated characteristic pattern CPa is compared with the characteristic pattern CP.

Figure 11:
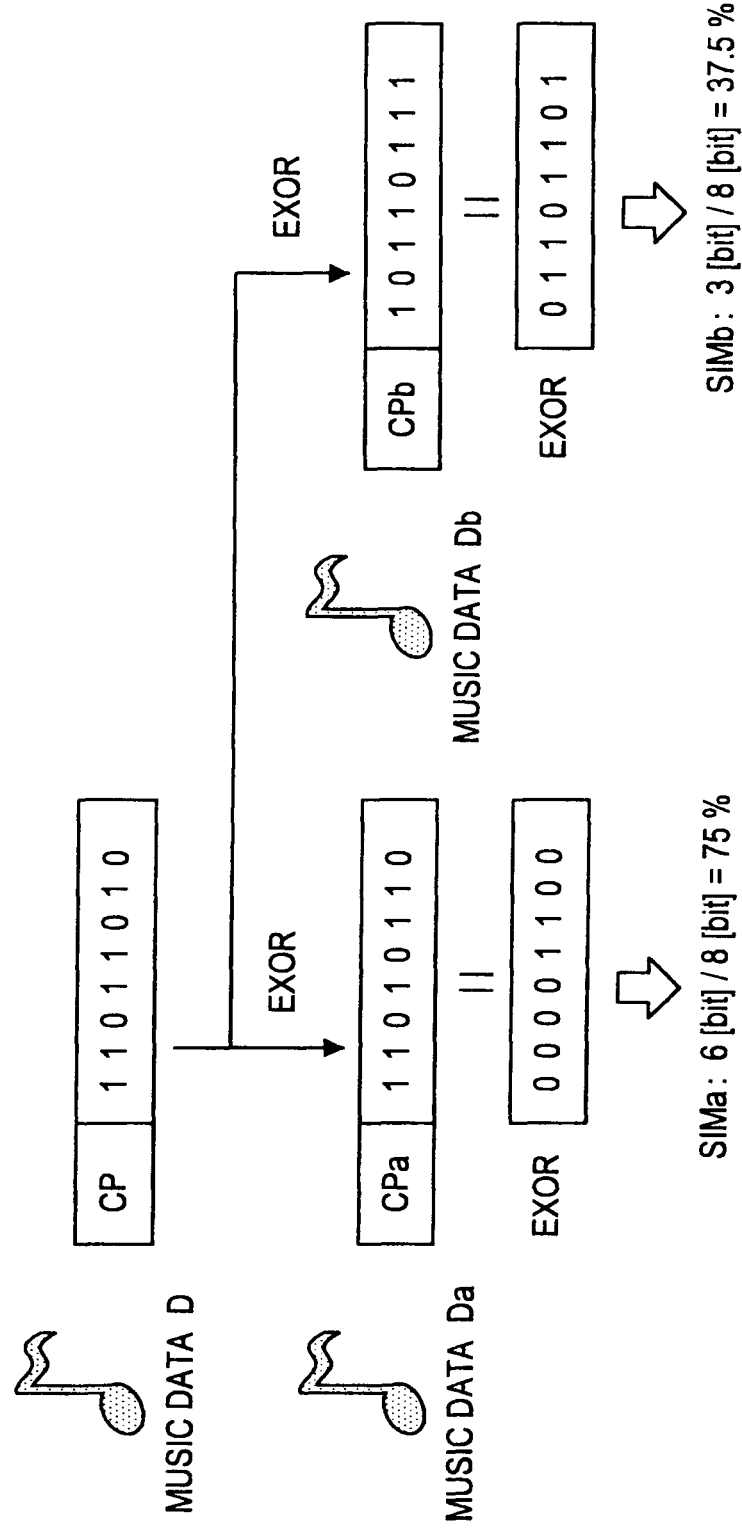
FIG. 11 is an explanatory diagram for explaining a music identification process according to the first embodiment.

FIG. 11 is an explanatory diagram for explaining an example of a music identification process executed by the music identification unit 20.

In FIG. 11, the characteristic pattern CP of the music data D, the characteristic pattern CPa of the music data Da and the characteristic pattern CPb of the music data Db are previously generated using the same window width Ws and coding period width We by the characteristic pattern generation unit 14. These characteristic patterns are read by the music identification unit 20 from the storage unit 12, for example.

Then, in order to determine the identity between the music data D and the music data Da, the music identification unit 20 calculates an exclusive OR (EXOR) of the respective bits of the characteristic pattern CP and the characteristic pattern CPa. As shown in FIG. 11, the exclusive OR of the characteristic pattern CP and the characteristic pattern CPa is "00001100." Further, in order to determine the identity between the music data D and the music data Db, the music identification unit 20 calculates an exclusive OR of the respective bits of the characteristic pattern CP and the characteristic pattern CPb. The exclusive OR of the characteristic pattern CP and the characteristic pattern CPb is "01101101."

Here, the bits of "0" in the calculated exclusive OR indicate that the code values of the bits of the characteristic patterns are the same. The bits of "1" indicate that the code values of the bits of the characteristic patterns are different. In other words, a higher ratio of bits of "0" in the calculated exclusive OR indicates a higher degree of similarity between the characteristic patterns.

Thus, the music identification unit 20 may use the ratio of the number of bits "0" in the calculated exclusive OR between the two characteristic patterns with respect to the number of total bits as a degree of similarity of characteristic patterns, for example. In the example of FIG. 11, the degree of similarity SIMa between the characteristic pattern CP and the characteristic pattern CPa is calculated as 6 [bits]/8 [bits] =75%, based on the calculated exclusive OR, "00001100," of the characteristic patterns. Similarly, the degree of similarity SIMb between the characteristic pattern CP and the characteristic pattern CPb is calculated as 3 [bits]/8 [bits]=37.5% based on the calculated exclusive OR, "01101101," of the characteristic patterns.

Further, although it is not illustrated in FIG. 11, the degree of similarity may be calculated based on the probability occurrence of bit "0" indicating that code values are matched and bit "1" indicating that code values are unmatched between the two characteristic patterns in a binomial distribution, instead of simple ratio of bits of "0" indicating matched code values. In more detail, for example, when the simple ratio of bits of "0" indicating matched code values is assumed as $P_0$, the degree of similarity based on the binomial distribution is given according to a probability $X_0$ (which makes random variable $X \geq P_0$) in the binomial distribution where the number of trials=total number of bits and success probability=50% (Note that, in this case, the lower probability $X_0$ indicates a higher degree of similarity).

Further, the maximum length of sequential part of the bits of "0" indicating that code values are matched in the calculated exclusive OR may be used to calculate the degree of similarity of the characteristic patterns. As an example, a case of comparing characteristic patterns of the same music recorded in the two different environments is considered. When there is noise only in a part during recording one piece of music data, code values of characteristic patterns of the noise part do not match at a probability of 50%. In other parts without noise, all other code values match between the two characteristic patterns, ideally. On the other hand, when characteristic patterns of different music are compared, unmatched code values are found not only a specific range such as a noise part but in the entire characteristic patterns. Thus, for example, when the maximum length of sequential bits of "0" indicating that code values are matched is used as the degree of similarity of the characteristic patterns, a determination of identity of music can be executed more robustly regarding an occurrence of noise.

The music identification unit 20 may compare the degree of similarity of characteristic patterns calculated by any of the above described methods with a predetermined threshold value for example to determine the identity of two pieces of music data of music. Further, the music identification unit 20 may notify the calculated degree of similarity of characteristic patterns to a user using a display device connected to the music processing apparatus 10 to let the user determine the identity of the music.

(Explanation of Process Flow: Music Identification)

Figure 12:
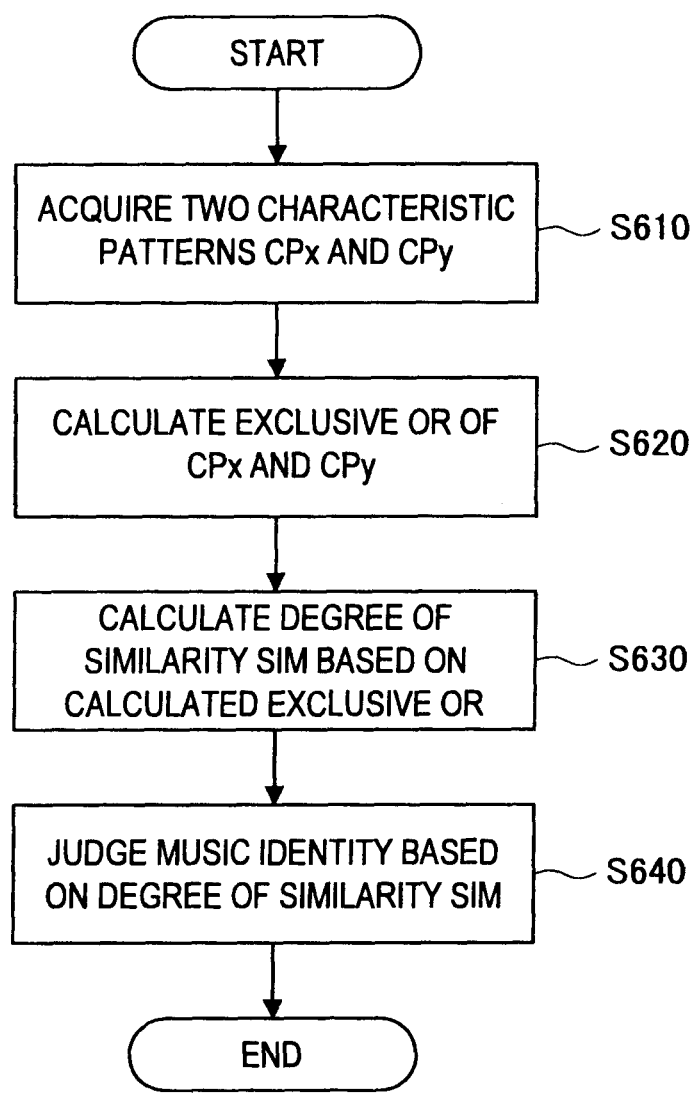
FIG. 12 is a flowchart showing an example of the music identification process according to the first embodiment.

FIG. 12 is a flowchart for explaining a flow of identifying music by the music processing apparatus 10 according to the present embodiment.

As shown in FIG. 12, firstly, the music identification unit 20 acquires two characteristic patterns CPx and CPy from the storage unit 12 (S610). The music identification unit 20 then calculates an exclusive OR of the characteristic patterns CPx and CPy (S620). Then, the music identification unit 20 calculates the degree of similarity SIM of the characteristic patterns CPx and CPy based on the calculated exclusive OR (S630). After that, the music identification unit 20 compares the calculated degree of similarity SIM with a predetermined threshold value to determine the identity of music or displays the degree of similarity SIM to let a user determine the identity of music, for example (S640).

The music identification process by the music processing apparatus 10 according to the present embodiment has been described above with reference to FIGS. 11 and 12. The music identification process according to the present embodiment is executed by using the characteristic pattern indicating characteristics of volume transitions as described above. Thus, the music identification can be executed with a practical accuracy regardless of affects of an offset discrepancy and the like cased by environmental differences, for example.

[Offset Correction Unit]

A process of correcting the discrepancy of the offsets from the start point of data to the start point of performance based on the result of the above described music identification process and the coding start position used for generating the characteristic pattern will be described.

Figure 13:
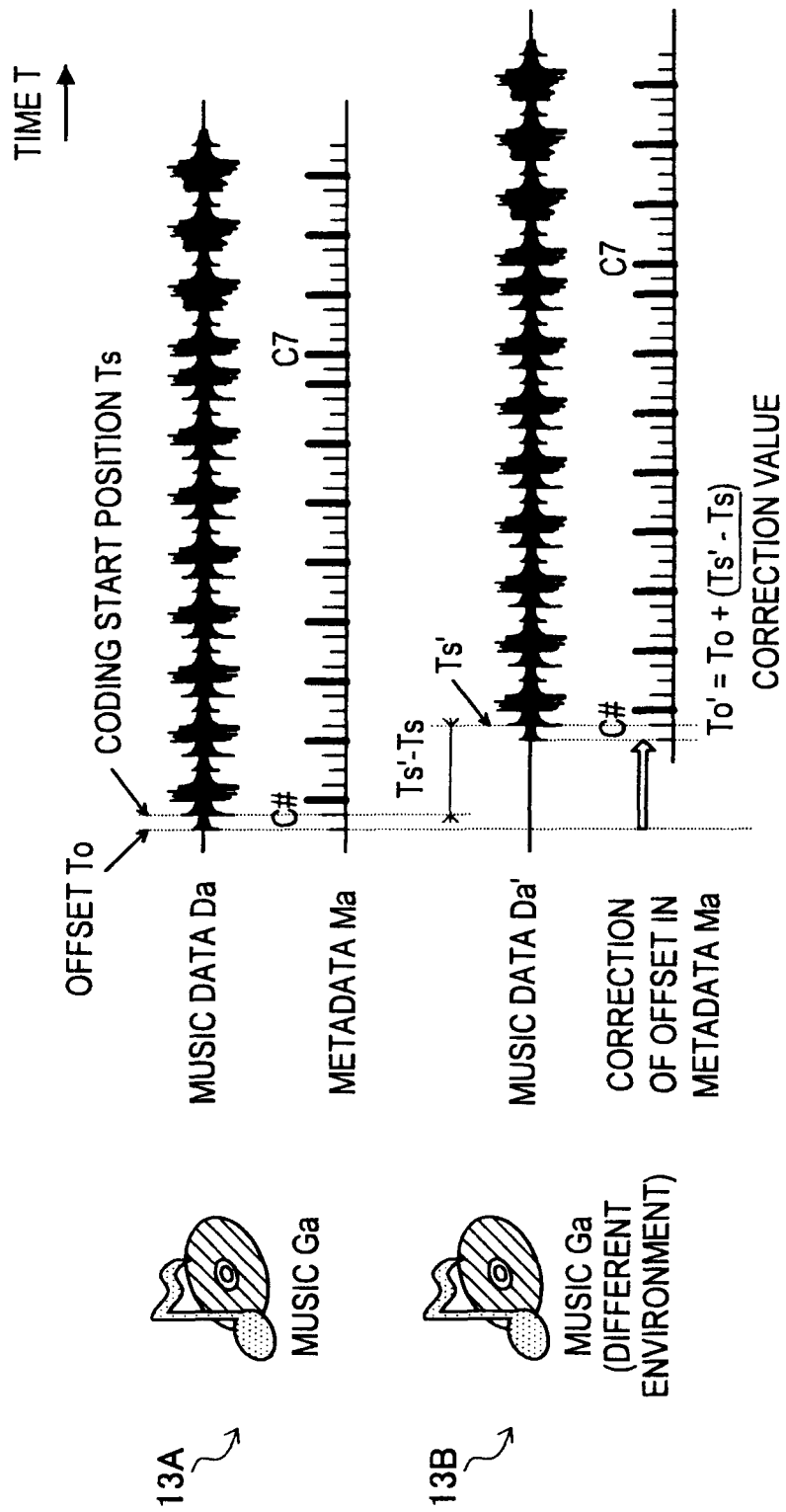
FIG. 13 is an explanatory diagram for explaining an offset correcting process according to the first embodiment.

The offset correction unit 22 corrects the offset of the music data or metadata based on the above described coding start position corresponding to the characteristic pattern of music data having a high degree of similarity. FIG. 13 is an explanatory diagram for explaining an example of an offset correcting process by the offset correction unit 22.

FIG. 13-13A shows a waveform of the music data Da of the music Ga and metadata Ma applied to the music data Da. FIG. 13-13A also shows an offset To of the music data Da included in the metadata Ma and a coding start position Ts of the music data Ga.

Further, FIG. 13-13B shows a waveform of the music data Da' of the music Ga, which is recorded in a different environment from the music data Da's recording environment. With reference to the waveform of the music data Da', the performance start timing of the music data Da' is later than that of the music data Da. In other words, due to the environmental differences, there is a gap between the offsets of the music data Da and the music data Da'. Thus, when the metadata Ma of the music data Da is simply used for the music data Da', time-series data such as beat positions and chord progressions included in the metadata Ma does not correspond to those of the music data Da'.

The offset correction unit 22 acquires the coding start position Ts' for the music data Da' determined by the start position determination unit 16 and corrects the offset when the metadata Ma applied to the music data Da' according to the difference with the coding start position Ts of the music data Ga. The corrected offset To' is calculated using the following equation.

[Equation 1]

$$To' = To + (Ts' - Ts) \quad (1)$$

As shown in FIG. 13, since the offset of the metadata Ma is corrected before being applied to the music data Da', the time-series data such as beat positions and chord progression included in the metadata Ma can match to those of the music data Da'.

Referring to FIG. 13, an example of correcting the offset of the metadata Ma using a correction value Ts'−Ts has been described. However, the offset of the music data Da' may be corrected using the correction value Ts'−Ts instead. In other words, when the music data Da' is reproduced, the start point of the play time may be skipped by the length of the correction value Ts'−Ts to match to the performance of the metadata Ma which is simply reproduced.

Further, the above description has been made based on an assumption that it is known in advance that the music data Da and music data Da' is generated from the same music Ga. However, for example, music data which has a high degree of similarity of characteristic patterns with the subject music data may be selected automatically or manually by the user among plural pieces of music data options and the offset may be corrected based on a coding start position of the selected music data.

[Explanation of Process Flow: Offset Correction]

Figure 14:
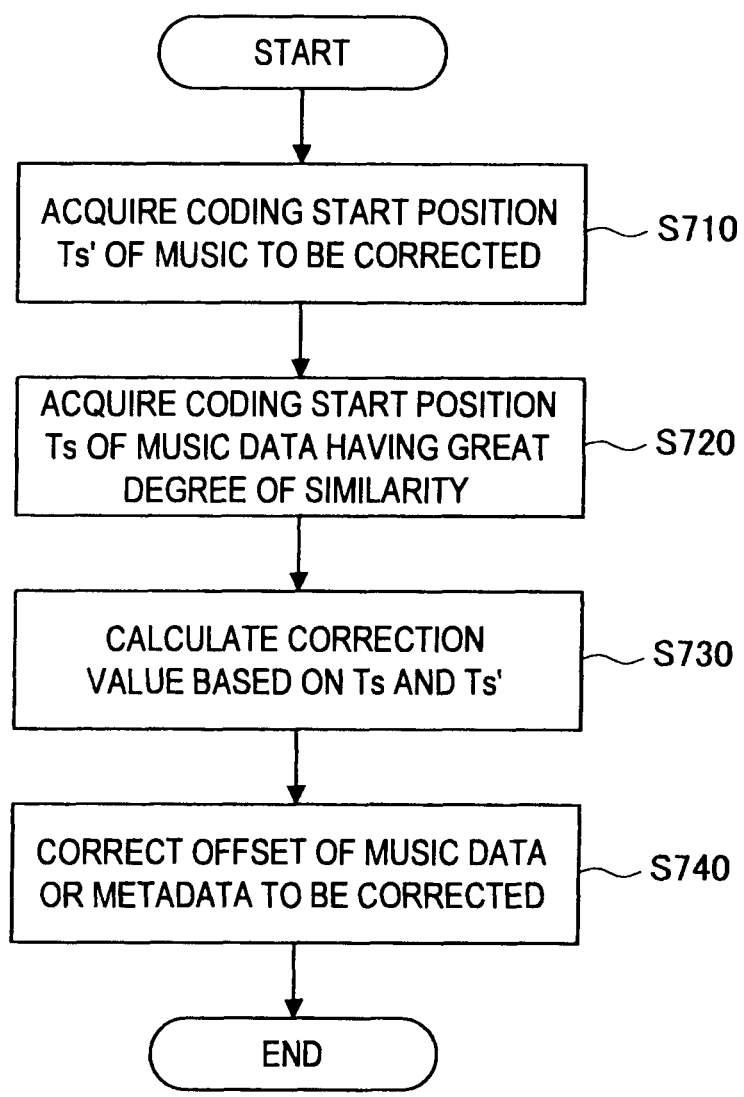
FIG. 14 is a flowchart showing an example of the offset correcting process according to the first embodiment.

FIG. 14 is a flowchart for explaining a flow of correcting an offset by the music processing apparatus 10 according to the present embodiment.

As shown in FIG. 14, the offset correction unit 22 firstly acquires a coding start position Ts' of subject music (S710). The offset correction unit 22 acquires a coding start position Ts of music data having a high degree of similarity of the characteristic pattern with that of the subject music (S720). The coding start positions Ts and Ts' are determined by the start position determination unit 16 in advance, for example. Further, the offset correction unit 22 calculates a correction value Ts'−Ts of the offset (S730). Then, the offset correction unit 22 corrects the offset of the correction subject music data or the metadata of the correction subject music data based on the correction value Ts'−Ts (S740).

Referring to FIGS. 13 and 14, an offset correction process by the music processing apparatus 10 according to the present embodiment has been described above. The offset correction process according to the present embodiment is executed based on a coding start position substantially indicating a position of performance on a time axis of a piece of music data. With this configuration, music data or metadata of music data can be used after correcting offset discrepancy caused by environmental differences.

Referring to FIGS. 3 to 14, the first embodiment of the present invention has been described in detail. In the first embodiment of the present invention, a single characteristic pattern indicating characteristics of relative volume transitions on the time axis is generated for one piece of music data. Here, as seen in the explanation of FIG. 6, the code value included in the characteristic pattern is determined based on the coding start position determined by the start position determination unit 16. Thus, it is possible to generate more than one characteristic patterns corresponding to a plurality of the coding start positions for one piece of music data to improve the quality of music identity determination. In this point of view, the following will describe an example, as a second embodiment of the present invention, in which a plurality of characteristic patterns are generated based on a plurality of the coding start positions determined using different window positions for one piece of music data.

<3. Second Embodiment>

Figure 15:
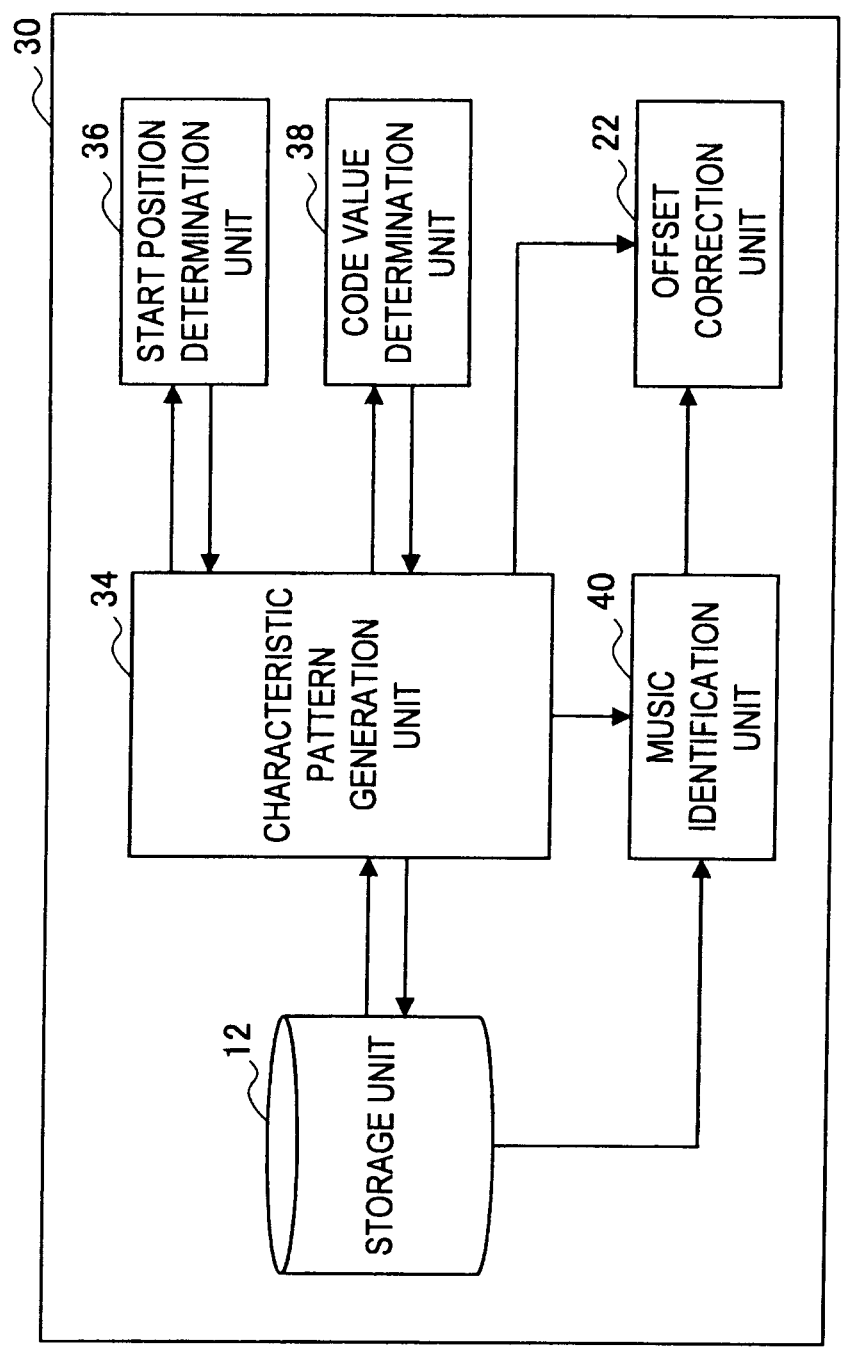
FIG. 15 is a block diagram showing a logical configuration of a music processing apparatus according to a second embodiment.

FIG. 15 is a block diagram for explaining a logical configuration of a music processing apparatus 30 according to a second embodiment of the present invention. As shown in FIG. 15, the music processing apparatus 30 includes a storage unit 12, a characteristic pattern generation unit 34, a start position determination unit 36, a code value determination unit 38, a music identification unit 40 and an offset correction unit 22.

[Characteristic Pattern Generation Unit]

According to the present embodiment, the characteristic pattern generation unit 34 acquires music data from the storage unit 12 and generates a plurality of characteristic patterns indicating characteristics of volume transitions of the obtained music data. When the characteristic patterns are generated, the characteristic pattern generation unit 34 firstly invokes the start position determination unit 36 and let the start position determination unit 36 determine a plurality of the coding start positions using different window widths.

[Start Position Determination Unit]

Figure 16:
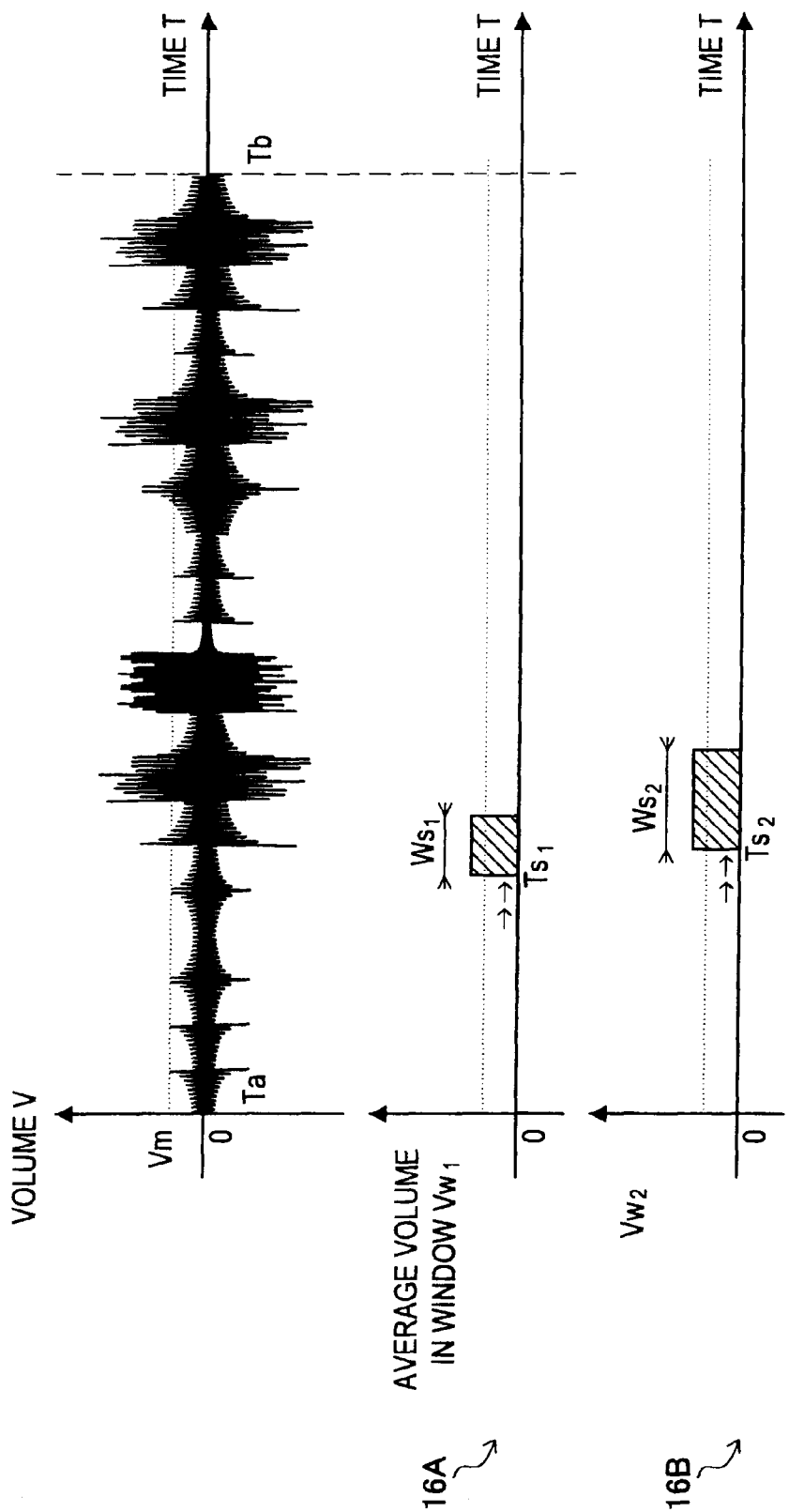
FIG. 16 is an explanatory diagram for explaining a coding start position determination process according to the second embodiment.

FIG. 16 is an explanatory diagram for explaining a coding start position determination process by the start position determination unit 36 according to the present embodiment.

As shown in FIG. 16, the start position determination unit 36 calculates a reference average volume Vm and then determines a position $Ts_1$ where an average volume $Vw_1$ of a window on the time axis having a window width $Ws_1$ excesses the reference average volume Vm for the first time (16A). Next, the start position determination unit 36 determines a position $Ts_2$ where an average volume $Vw_2$ of a window on the time axis having a window width $Ws_2$ which is different from the window width $Ws_1$ excesses the reference average volume Vm for the first time (16B). As described above, in the present embodiment, the start position determination unit 36 determines a plurality of the coding start positions $Ts_i$ (i=1, 2 . . . ) based on different window widths $Ws_i$ and outputs the determined a plurality of the coding start positions $Ts_i$ to the characteristic pattern generation unit 34.

[Code Value Determination Unit]

Figure 17:
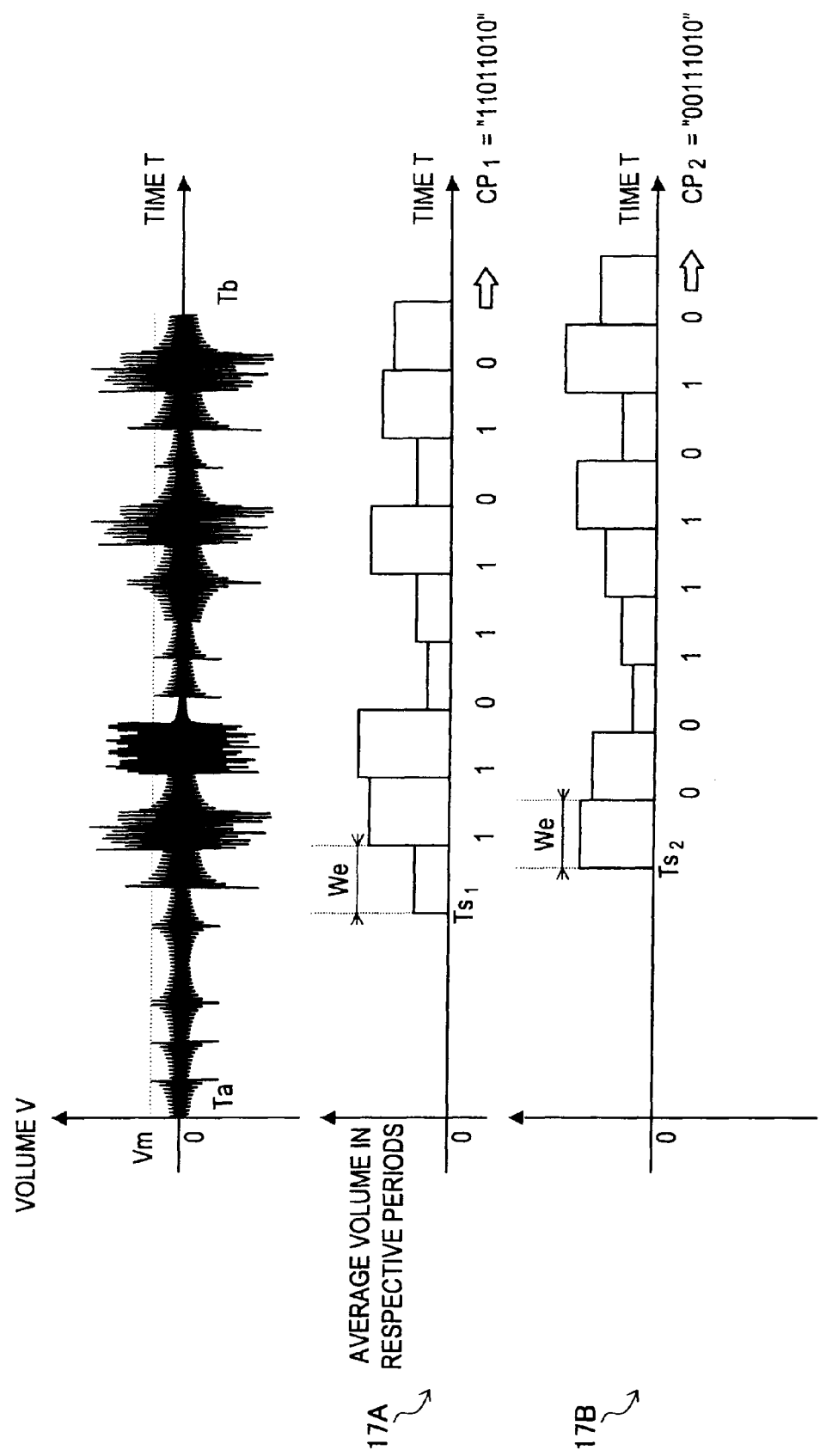
FIG. 17 is an explanatory diagram for explaining a code value determination process according to the second embodiment.

FIG. 17 is an explanatory diagram for explaining a code value determination process by the code value determination unit 38 according to the present embodiment.

FIG. 17-17A shows nine coding periods having a period width We, starting at the coding start position $Ts_1$. FIG. 17-17B also shows nine coding periods having the period width We, starting at the coding start position $Ts_2$. Regarding the respective coding periods, the code value determination unit 38 determines code values according to whether an average volume of the respective periods are greater or less than the respective next previous periods.

The characteristic pattern generation unit 34 combines the determined code values of the respective periods through a series of the coding periods and generates characteristic patterns $CP_i$ of the respective coding start position $Ts_i$. In the example of FIG. 17, a characteristic pattern $CP_1$ of "11011010" is generated for the coding start position $Ts_1$ and a characteristic pattern $CP_2$ of "00111010" is generated for the coding start position $Ts_2$.

Figure 18:
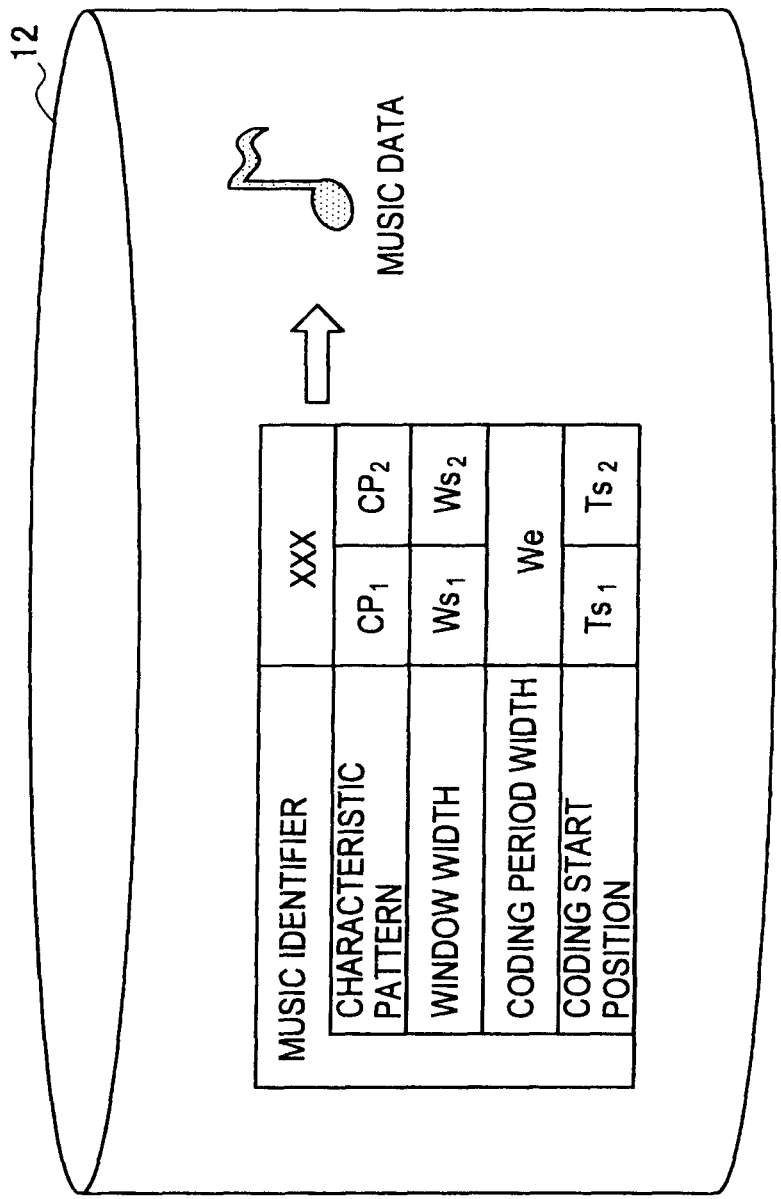
FIG. 18 is an explanatory diagram for explaining data set output from a characteristic pattern generation unit according to the second embodiment.

The characteristic pattern $CP_i$ generated in the above described process and the window width $Ws_i$ and coding period width We used for generating the characteristic patterns $CP_i$ are used for a later described music data identification. Further, the coding start position $Ts_i$ is used for an offset correction. As shown in a case of i≤2 in FIG. 18, the characteristic pattern generation unit 34 stores the characteristic pattern $CP_i$, window width $Ws_i$, coding period width We and coding start position $Ts_i$ to the storage unit 12 as one data set.

[Explanation of Process Flow: Generation of a Plurality of Characteristic Patterns]

Figure 19:
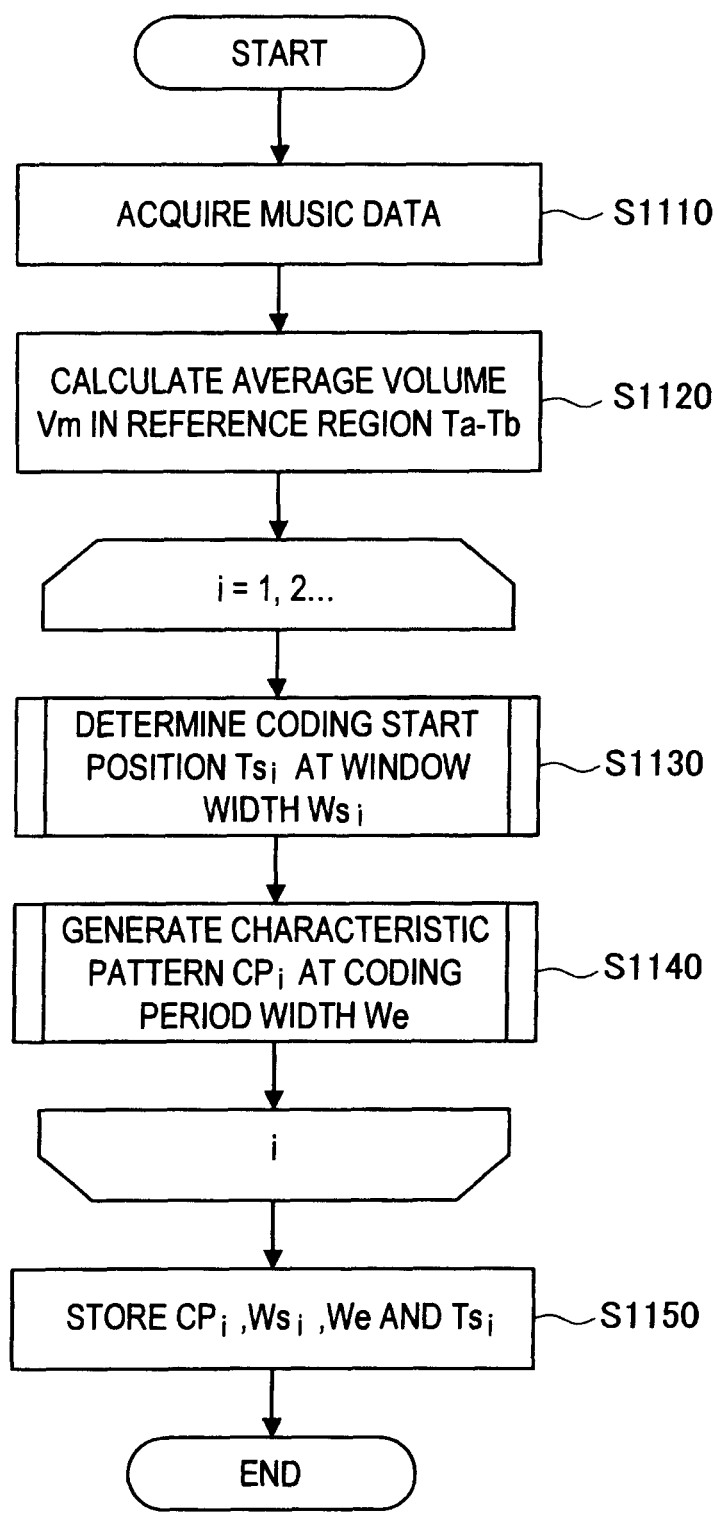
FIG. 19 is a flowchart showing an example of a characteristic pattern generation process according to the second embodiment.

FIG. 19 is a flowchart for explaining a flow of a characteristic pattern generation by the music processing apparatus 30 according to the present embodiment.

As shown in FIG. 19, the characteristic pattern generation unit 34 firstly acquires music data from the storage unit 12 (S1110). The characteristic pattern generation unit 34 invokes the start position determination unit 36 and the characteristic pattern generation unit 34 calculates a reference average volume Vm within a reference region from Ta to Tb (S1120). Then, the start position determination unit 36 determines a plurality of the coding start positions $Ts_i$ using the reference average volume Vm and the window widths $Ws_i$ (i=1, 2 . . . ) (S1130). Then, the characteristic pattern generation unit 34 generates a plurality of characteristic patterns $CP_i$ using the plurality of the coding start positions $Ts_i$ and the coding period width We (S1140). The steps S1130 and S1140 are repeated until characteristic patterns $CP_i$ for all window widths $Ws_i$ are generated. Then, after the characteristic patterns $CP_i$ for all window width $Ws_i$ are generated, the characteristic pattern generation unit 34 stores the characteristic patterns $CP_i$, window width $Ws_i$, coding period width We and coding start position $Ts_i$ to the storage unit 12 as one data set (S1150).

[Music Identification Unit]

The music identification unit 40 configured to identify music based on those a plurality of characteristic patterns will be described. The music identification unit 40 compares the respective characteristic patterns generated for the music data with characteristic patterns generated for arbitrary music to calculate the degree of similarity of the respective characteristic patterns. Here, it is assumed that the characteristic patterns generated based on the same window width $Ws_i$ are compared.

Figure 20:
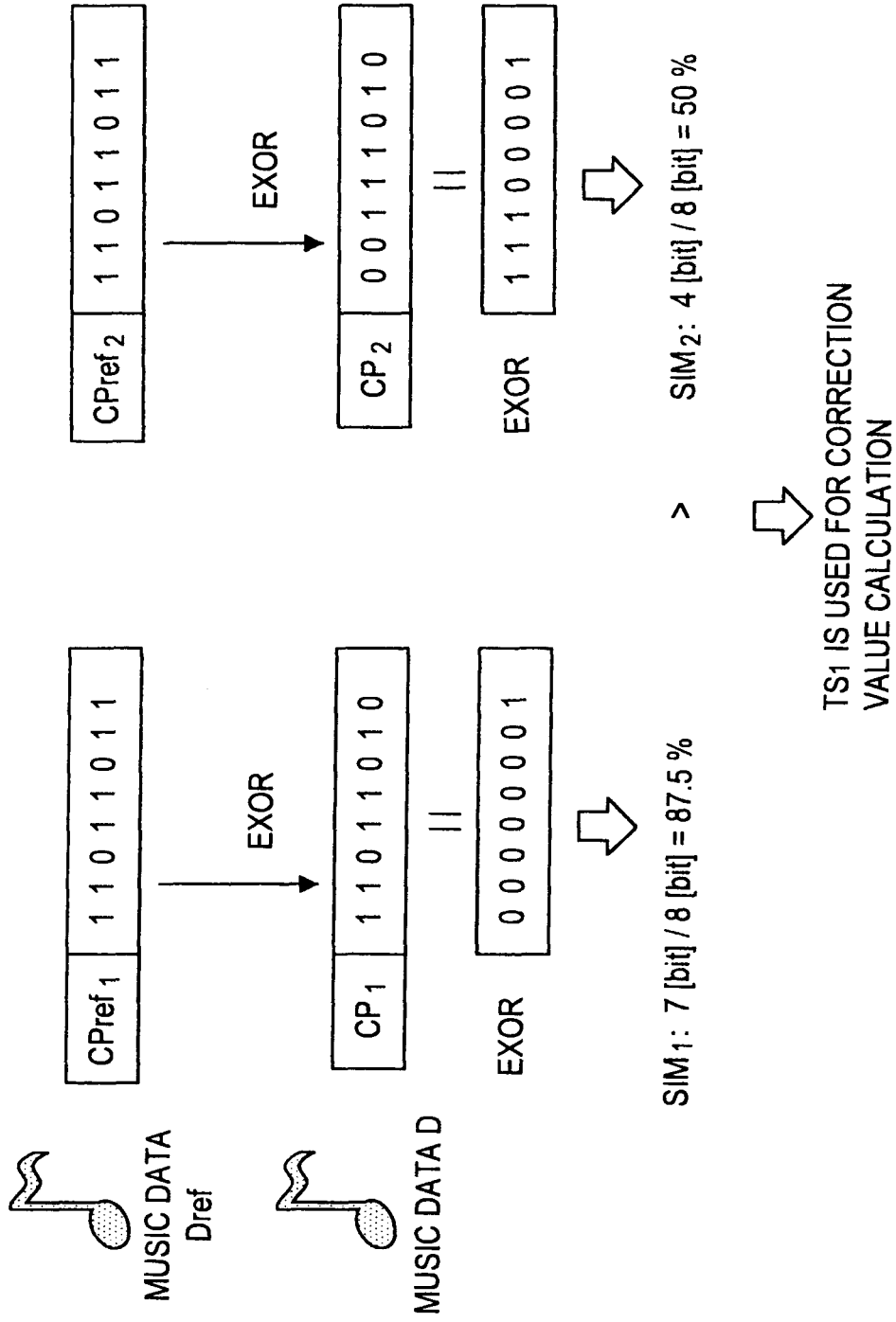
FIG. 20 is an explanatory diagram for explaining a music identification process according to the second embodiment.

FIG. 20 is an explanatory diagram for explaining an example of a music identification process by the music identification unit 40.

FIG. 20 shows two characteristic patterns $CP_1$ and $CP_2$ generated for the music data D and two characteristic patterns $CPref_1$ and $CPref_2$ generated for the music data Dref. Among these characteristic patterns, the characteristic patterns $CP_1$ and $CPref_1$ and the characteristic patterns $CP_2$ and $CPref_2$ are respectively generated based on the same window width.

The music identification unit 40 calculates an exclusive OR (EXOR) of the respective bits of those characteristic patterns. In the example of FIG. 20, the exclusive OR of the characteristic patterns $CP_1$ and $CPref_1$ is "00000001." The exclusive OR of characteristic patterns $CP_2$ and $CPref_2$ is "11100001."

Then, the music identification unit 40 calculates the degrees of similarity $SIM_1$, $SIM_2$ of characteristic patterns for the respective window width based on the calculated exclusive ORs. In the example of FIG. 20, a simple ratio of bit "0" in the characteristic patterns is defined as the degree of similarity. The degree of similarity $SIM_1$ between the characteristic patterns $CP_1$ and $CPref_1$ is 87.5% and the degree of similarity $SIM_2$ between the characteristic patterns $CP_2$ and $CPref_2$ is 50%.

As seen in FIG. 20, the degree of similarity of characteristic patterns may vary depending on the window width used to determine the coding start position even between the music data D and the music data Dref which are both produced from the same music data. Here, the highest degree of similarity among plural degrees of similarity can be employed as a degree of similarity between the pieces of music data. In this case, according to the example of FIG. 20, since the degree of similarity $SIM_1$ is higher than the degree of similarity $SIM_2$, the degree of similarity $SIM_1$ is employed as the degree of similarity between the music data D and the music data $D_{ref}$.

The difference between the coding start positions of the characteristic patterns $CP_1$ and the $CPref_1$, which are used to calculate the employed degree of similarity $SIM_1$, is relevant to a difference of offsets of the music data D and the music data Dref. The difference of the coding start positions of the characteristic patterns $CP_1$ and $CPref_1$ thus can be used as a correction value in a later described offset correction process.

[Explanation of Process Flow: Music Identification and Offset Correction]

Figure 21:
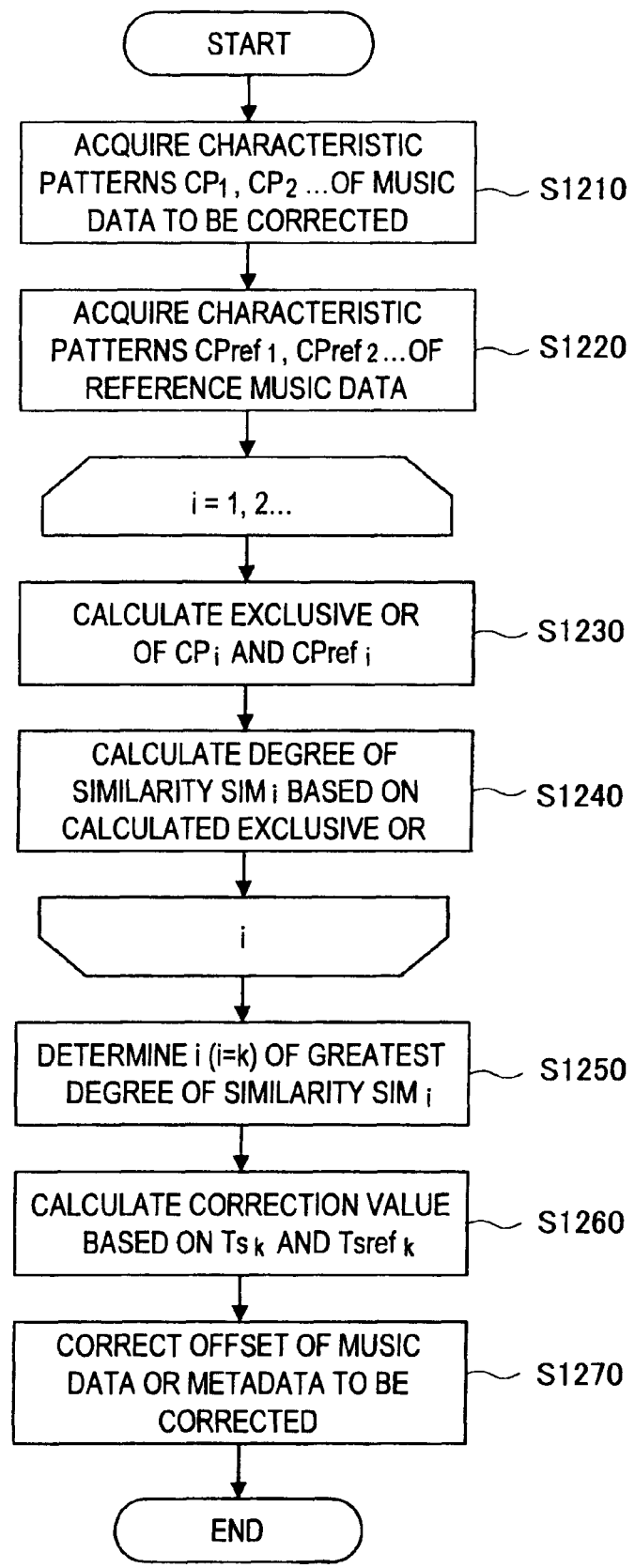
FIG. 21 is a flowchart showing an example of the music identification process and offset correcting process according to the second embodiment.

FIG. 21 is a flowchart for explaining a flow of a music identification and an offset correction by the music processing apparatus 30 according to the present embodiment.

As shown in FIG. 21, the music identification unit 40 firstly acquires characteristic patterns $CP_i$ (i=1, 2 . . . ) of subject music data to be corrected (S1210). The music identification unit 40 then acquires characteristic patterns $CPref_i$ (i=1, 2 . . . ) of reference music data (S1220).

The music identification unit 40 calculates exclusive ORs of the characteristic patterns $CP_i$ and the characteristic patterns $CPref_i$ for the respective window widths (S1230). Further, based on the calculated exclusive ORs, degrees of similarity $SIM_i$ of the respective window widths are calculated (S1240). The steps S1230 and S1240 are repeated until the degrees of similarity $SIM_i$ for all window widths are calculated. When calculation of all degrees of similarity $SIM_i$ is completed, the music identification unit 40 determines the "i" so that the highest degree of similarity $SIM_i$ is obtained (S1250). In FIG. 21, it is assumed that the highest degree of similarity $SIM_i$ is obtained when i=k.

The offset correction unit 22 calculates an offset correction value based on the coding start position $Ts_k$ of the characteristic pattern $CP_k$ corresponding to the degree of similarity $SIM_k$ and the coding start position $Tsref_k$ of the characteristic pattern $CPref_k$ (S1260). The offset correction unit 22 corrects the offset of the subject music data to be corrected or metadata of the music data based on the calculated correction value (S1270).

Referring to FIGS. 15 to 21, the second embodiment of the present invention has been described. According to the present embodiment, a plurality of characteristic patterns are generated for one piece of music data based on a plurality of the coding start positions determined based on different window widths. Then, offset of music data or metadata of the music data is corrected based on the coding start position corresponding to the characteristic pattern having the highest degree of similarity with the reference characteristic patterns among the generated plurality of characteristic patterns. This can improve the quality of music identity determination based on the degree of similarity and improve accuracy of the offset correction.

The series of processes according to the first and second embodiments described in this specification are realized by software in general. When software executes the series of or a part of the processes, programs constituting the software are executed in a general-purpose compute and the like as shown in FIG. 22.

In FIG. 22, a CPU (Central Processing Unit) 902 controls overall operations of a general-purpose computer. A ROM (Read Only Memory) 904 stores programs or data of a part of or all of the series of processes. A RAM (Random Access Memory) 906 temporarily stores programs or data used by the CPU 902 during the process executions.

The CPU 902, ROM 904 and RAM 906 are connected to each other via a bus 910. The bus 910 is further connected to an input/output interface 912.

The input/output interface 912 is an interface to connect the CPU 902, ROM 904 and RAM 906 to an input device 920, an output device 922, a storage device 924, a communication device 926 and a drive 930.

The input device 920 is, for example, configured to receive an instruction or input information from a user via an input device such as a mouse, a keyboard or a touch panel. The output device 922 is, for example, configured to output information to the user via a display device such as a CRT (Cathode Ray Tube), a liquid crystal display and an OLED (Organic Light Emitting Diode) or an audio output device such as a speaker.

The storage device 924 is composed of a hard disk drive, a flash memory and the like and stores programs or program data. The communication device 926 executes communication processes via a network such as a LAN or the Internet. The drive 930 is provided to the general-purpose computer according to need and attached with a removable medium 932, for example.

When the series of processes according to the first and second embodiments are executed by software, the programs stored in the ROM 904, storage device 924 or removable medium 932 shown in FIG. 22 for example are read by the RAM 906 during execution and executed by the CPU 902.

Preferred embodiments of the present invention have been described with reference to the attached drawings; however, it should be appreciated that the present invention is not limited to those embodiments. It is clear for a person skilled in the art that various changes and modifications within a scope of the claims are a part of technical range of the present invention.

For example, regarding the music data of this specification, differences between stereo data and monaural data are not described; however, characteristic patterns may be separately generated for each of stereo data. Further, characteristic patterns may be generated after combining a pair of pieces of stereo data.

In addition, the order of the processes shown in the respective flowcharts of the first and second embodiments may be changed when the processes are executed. The respective process steps may include a process which is executed in parallel or independently.

The present invention contains subject matter related to Japanese Patent Application JP 2008-226344 filed in the Japan Patent Office on Sep. 3, 2008, the entire contents of which being incorporated herein by reference.

What is claimed is:

1. A music processing method utilizing at least a computer processor to implements steps comprising:
    determining code values according to a volume transition in every certain period starting from a plurality of coding start positions on a time axis in music data wherein each of the code values indicates whether an average volume in a certain period is increased or decreased from an average volume of a previous period;
    determining each of the plurality of coding start positions by acquiring a window position where an average volume in a window width on the time axis in the music data excesses an average volume of an entire or a part of the music data for the first time, wherein each of the coding start positions is determined using a different window width;
    generating a plurality of characteristic patterns of the music data, each indicating a characteristic of the volume transition of the music data, using a series of the code values determined over plural periods; and
    correcting an offset of the music data or metadata related to the music data based on a window position of the music data by:
        calculating a degree of similarity for the plurality of characteristic patterns by comparing the plurality of characteristic patterns generated for the music data with characteristic patterns of arbitrary music data; and
        correcting the offset of the music data or metadata related to the music data based on the window position of a coding start position corresponding to a characteristic pattern among the plurality of characteristic patterns of the music data having a highest calculated degree of similarity to a characteristic pattern of the arbitrary music data.

2. The music processing method according to claim 1, wherein the degree of similarity is calculated as a ratio of a number of bits of matched code values between two characteristic patterns to a number of total bits.

3. The music processing method according to claim 1, wherein the degree of similarity is calculated based on an occurrence probability in a binomial distribution for bits indicating that code values are matched and bits indicating that code values are unmatched between two characteristic patterns.

4. The music processing method according to claim 1, wherein the degree of similarity is calculated based on a maximum length of sequentially matched part of code values of two characteristic patterns.

5. A music processing memory storage device having instructions stored thereon to implement steps comprising:
    determining code values according to a volume transition in every certain period starting from a plurality of coding start positions on a time axis in music data wherein each of the code values indicates whether an average volume in a certain period is increased or decreased from an average volume of a previous period;

determining each of the plurality of coding start positions by acquiring a window position where an average volume in a window width on the time axis in the music data excesses an average volume of an entire or a part of the music data for the first time, wherein each of the coding start positions is determined using a different window width;

generating a plurality of characteristic patterns of the music data, each indicating a characteristic of the volume transition of the music data, using a series of the code values determined over plural periods; and correcting an offset of the music data or metadata related to the music data based on a window position of the music data by:
    calculating a degree of similarity for the plurality of characteristic patterns by comparing the plurality of characteristic patterns generated for the music data with characteristic patterns of arbitrary music data; and
    correcting the offset of the music data or metadata related to the music data based on the window position of a coding start position corresponding to a characteristic pattern among the plurality of characteristic patterns of the music data having a highest calculated degree of similarity to a characteristic pattern of the arbitrary music data.

6. A music processing apparatus comprising:

a computer processor;

a code value determination unit, executed by the computer processor, for determining code values according to a volume transition in every certain period starting from a plurality of coding start positions on a time axis in music data wherein each of the code values indicates whether an average volume in a certain period is increased or decreased from an average volume of a previous period;

a window position acquiring unit, executed by the computer processor, for determining each of the plurality of coding start positions by acquiring a window position where an average volume in a window width on the time axis in the music data excesses an average volume of an entire or a part of the music data for the first time, wherein each of the coding start positions is determined using a different window width;

a characteristic pattern generation unit, executed by the computer processor, for generating a plurality of characteristic patterns of the music data, each indicating a characteristic of the volume transition of the music data, using a series of the code values determined over plural periods; and an offset correction unit, executed by the computer processor, for correcting an offset of the music data or metadata related to the music data based on a window position of the music data by:
    calculating a degree of similarity for the plurality of characteristic patterns by comparing the plurality of characteristic patterns generated for the music data with characteristic patterns of arbitrary music data; and
    correcting the offset of the music data or metadata related to the music data based on the window position of a coding start position corresponding to a characteristic pattern among the plurality of characteristic patterns of the music data having a highest calculated degree of similarity to a characteristic pattern of the arbitrary music data.

\* \* \* \* \*